US012019993B2

(12) United States Patent
Scherer et al.

(10) Patent No.: US 12,019,993 B2
(45) Date of Patent: Jun. 25, 2024

(54) SYSTEMS AND METHODS FOR SHORT- AND LONG-TERM DIALOG MANAGEMENT BETWEEN A ROBOT COMPUTING DEVICE/DIGITAL COMPANION AND A USER

(71) Applicant: Embodied, Inc., Pasadena, CA (US)

(72) Inventors: Stefan A. Scherer, Santa Monica, CA (US); Mario E Munich, La Canada, CA (US); Paolo Pirjanian, Glendale, CA (US); Kevin D Saunders, Irvine, CA (US); Wilson Harron, Los Angeles, CA (US); Marissa Kohan, Woodland Hills, CA (US)

( * ) Notice: Subject to any disclaimer, the term of this patent is extended or adjusted under 35 U.S.C. 154(b) by 327 days.

(21) Appl. No.: 17/434,847

(22) PCT Filed: Feb. 26, 2021

(86) PCT No.: PCT/US2021/020056
§ 371 (c)(1),
(2) Date: Aug. 30, 2021

(87) PCT Pub. No.: WO2021/174102
PCT Pub. Date: Sep. 2, 2021

(65) Prior Publication Data

US 2022/0092270 A1 Mar. 24, 2022

Related U.S. Application Data

(60) Provisional application No. 63/153,936, filed on Feb. 25, 2021, provisional application No. 62/983,592, filed on Feb. 29, 2020.

(51) Int. Cl.
*G06F 40/35* (2020.01)
*G10L 13/027* (2013.01)
(Continued)

(52) U.S. Cl.
CPC ............ *G06F 40/35* (2020.01); *G10L 13/027* (2013.01); *G10L 15/07* (2013.01); *G10L 15/22* (2013.01);
(Continued)

(58) Field of Classification Search
CPC ....... G10L 15/22; G10L 15/063; G10L 15/25; G10L 25/78; G10L 2015/0635;
(Continued)

(56) References Cited

U.S. PATENT DOCUMENTS 4,516,260 A * 5/1985 Breedlove ................ G09B 5/06 704/E15.04
9,311,527 B1 * 4/2016 Yin ........................... G06F 3/00
(Continued)

FOREIGN PATENT DOCUMENTS

CN 106844334 A * 6/2017 .......... B25J 11/0005
CN 108877785 A * 11/2018 ............ G10L 15/22
(Continued)

OTHER PUBLICATIONS

International Search Report and Written Opinion of the International Searching Authority, dated Jun. 30, 2021, PCT/US21/20035, 12 pages.

(Continued)

*Primary Examiner* — Mohammad K Islam
(74) *Attorney, Agent, or Firm* — Mark R. Kendrick

(57) ABSTRACT

Systems and methods for managing conversations between a robot computing device and a user are disclosed. Exemplary implementations may: initiate a first-time user experience sequence with the user; teach the user the robot computing capabilities and/or characteristics; initiate, utilizing a dialog manager, a conversation with the user; receive, one or more command files from the user via one or more microphones; and generate conversation response files and (Continued)

communicating the generated conversation files to the dialog manager in response to the one or more received user global command files to initiate an initial conversation exchange.

18 Claims, 9 Drawing Sheets

(51) Int. Cl.
*G10L 15/07* (2013.01)
*G10L 15/22* (2006.01)
*G10L 15/26* (2006.01)

(52) U.S. Cl.
CPC ........ *G10L 15/26* (2013.01); *G10L 2015/223* (2013.01)

(58) Field of Classification Search
CPC ....... G10L 12/027; G10L 15/07; G10L 15/26; G10L 2015/223; G06F 40/35; G05D 3/20; G06K 9/00248; G06K 9/00281; H04R 1/406; H04R 3/005
See application file for complete search history.

(56) References Cited

U.S. PATENT DOCUMENTS 9,621,984 B1 * 4/2017 Chu ....................... H04R 1/406
10,242,666 B2 * 3/2019 Monceaux ............. G06N 3/008
11,037,549 B1 * 6/2021 Kulkarni ............. G10L 15/1815
11,657,797 B2 * 5/2023 Vishnoi .................. G06N 20/00 704/260
2002/0165642 A1 7/2002 Sakaue et al.
2007/0128979 A1 6/2007 Shackelford et al.
2007/0192910 A1 * 8/2007 Vu .......................... B25J 19/06 901/17
2009/0055019 A1 2/2009 Stiehl et al.
2010/0034397 A1 * 2/2010 Nakadai ................ G01S 3/8006 381/58
2010/0076750 A1 3/2010 Cosatto et al.
2015/0148953 A1 5/2015 Laurent et al.
2015/0281833 A1 * 10/2015 Shigenaga ............. H04R 3/005 381/92
2015/0339589 A1 11/2015 Fisher
2016/0199977 A1 7/2016 Breazeal
2017/0125008 A1 5/2017 Maisonnier et al.
2017/0358305 A1 12/2017 Kudurshian et al.
2018/0068226 A1 3/2018 O'Connor et al.
2018/0121415 A1 * 5/2018 Perez .................... G06F 16/367
2018/0133900 A1 5/2018 Breazeal et al.
2018/0229372 A1 8/2018 Breazeal et al.
2018/0260680 A1 9/2018 Finkelstein et al.
2018/0277117 A1 9/2018 Hergenroeder
2018/0301151 A1 10/2018 Mont-Reynaud et al.
2018/0374494 A1 * 12/2018 Yamaya ................. G06V 40/20
2019/0005951 A1 * 1/2019 Kang ...................... G10L 15/22
2019/0025400 A1 * 1/2019 Venalainen ............ G06N 20/00
2019/0042988 A1 2/2019 Brown et al.
2019/0206400 A1 * 7/2019 Cui ..................... G10L 15/1815
2019/0206401 A1 * 7/2019 Liu ........................ G06V 20/10
2019/0206407 A1 * 7/2019 Shukla .................... G10L 15/24
2019/0248019 A1 8/2019 Nelson
2019/0279639 A1 9/2019 Ginsberg et al.
2019/0366538 A1 12/2019 Laurent et al.
2020/0034732 A1 * 1/2020 Freed ....................... G06N 5/02
2020/0050173 A1 2/2020 Scherer et al.
2020/0218781 A1 7/2020 Takano et al.
2020/0312298 A1 * 10/2020 Bui ......................... G06F 3/167
2020/0342850 A1 * 10/2020 Vishnoi ................... G06F 40/30
2020/0349228 A1 * 11/2020 Bharara .............. G10L 15/1822
2021/0303798 A1 * 9/2021 Duong .................... H04L 51/02
2023/0162750 A1 * 5/2023 Murgai ............... G10L 21/0208 704/231

FOREIGN PATENT DOCUMENTS

CN 111563140 8/2020
JP WO2005086051 A1 * 3/2004 ............. G10L 15/22
WO WO-2017218234 A1 * 12/2017 .............. A47L 11/24
WO WO-2018177561 A1 * 10/2018 .......... B25J 11/0005
WO WO/2019/144542 8/2019
WO WO-2022115199 A1 * 6/2022 ........... G06F 21/602

OTHER PUBLICATIONS

International Search Report and Written Opinion of the International Searching Authority, dated May 20, 2021, PCT/US21/20124, 11 pages (2nd).
International Search Report and Written Opinion of the International Searching Authority, dated Aug. 9, 2021, PCT/US21/29297, 15 pages.
International Search Report and Written Opinion of the International Searching Authority, dated Jun. 9, 2021, PCT/US21/20128, 10 pages.
International Search Report and Written Opinion of the International Searching Authority, dated May 18, 2021, PCT/US21/20148, 12 pages.
International Search Report and Written Opinion of the International Searching Authority, dated May 18, 2021, PCT/US21/20056, 21 pages.
International Search Report and Written Opinion of the International Searching Authority, Mailed May 2, 2022, PCT/US22/14213, 21 pages.

* cited by examiner

SYSTEMS AND METHODS FOR SHORT- AND LONG-TERM DIALOG MANAGEMENT BETWEEN A ROBOT COMPUTING DEVICE/DIGITAL COMPANION AND A USER

CROSS-REFERENCE TO RELATED APPLICATIONS

This application is a national stage filing and claims priority to PCT Application No. PCT/US2021/20056, filed Feb. 26, 2021, entitled "Systems And Methods For Short- and Long Term Dialog Management Between A Robot Computing Device/Digital Companion And A User", which claim priority to U.S. provisional patent application Ser. No. 63/153,936, filed Feb. 25, 2021, entitled "Systems And Methods For Short- and Long Term Dialog Management Between A Robot Computing Device/Digital Companion And A User"; and U.S. provisional patent application Ser. No. 62/983,592, filed Feb. 29, 2020, entitled "Systems And Methods For Short- and Long Term Dialog Management Between A Robot Computing Device/Digital Companion And A User," the entire disclosures and content of which are all hereby incorporated by reference.

FIELD OF THE DISCLOSURE

The present disclosure relates to systems and methods for managing conversations between a robot computing device and a user.

BACKGROUND

Human-machine interaction currently is a very cumbersome and asymmetric process that requires the human user to explicitly use a so-called "wakeword" or hot-word ("Alexa", "Siri", etc.) to initiate a conversation transaction. Then, the user provides an explicit often-learned command or phrasing to render a successful result in the conversation transaction. With current machines or robot computing devices, conversation interactions only function in a single-transactional fashion (i.e., the human user has an explicit request and the agent provides a single response), and multi-turn conversations interactions are rare if not non-existent and do not go beyond direct requests to gather information or reduce ambiguity. For example, a sample conversation may look like User: Alexa, I want to make a reservation; Alexa/Machine: Ok, which restaurant?; User: Tar and Roses in Santa Monica and Alexa makes the reservation. Further, current conversational agents or modules are also fully reactive and do not proactively engage or re-engage the user after the user has 1) lost interest in the interaction or 2) is stuck in a problem that they do not know how to overcome.

SUMMARY

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1A:
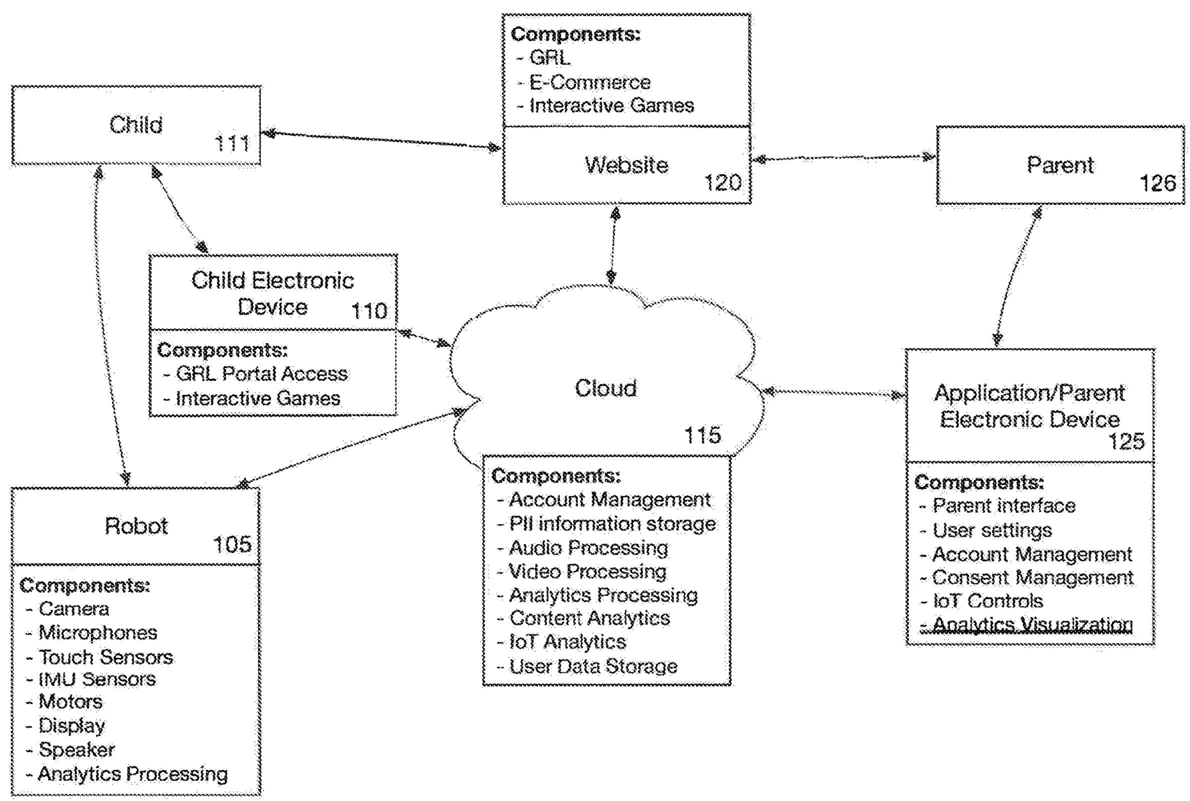
FIG. 1A illustrates a system for a social robot or digital companion to engage a child and/or a parent, in accordance with one or more implementations.

The following detailed description and provides a better understanding of the features and advantages of the inventions described in the present disclosure in accordance with the embodiments disclosed herein. Although the detailed description includes many specific embodiments, these are provided by way of example only and should not be construed as limiting the scope of the inventions disclosed herein.

The claimed subject matter is directed to a new conversation agent or module that among other enhancements is proactive. With prior conversation agents or modules, out of the hundreds of thousands of skills that prior art device Alexa is capable of fulfilling, very few are actually utilized (e.g., timers, radio, weather, etc.). The dialog manager (e.g., conversation agent or module) described herein proactively offers up skills and content that the user has not interacted with or has enjoyed in the past. In some implementations, a planning manager module may take on the role of selecting these activities proactively.

In some implementations, conversational interfaces provide a low barrier of entry in order to operate and allow humans to communicate in a natural fashion with an agent. However, most conversational agents or systems struggle to convey to the user what content or activities are available or accessible to the users when utilizing the conversation system. In addition, if the human user does not know exactly what content the user intends to access, the conversation interaction experience quickly becomes frustrating to the user as the conversational agent or system has no other means than to rely on so-called fallback conversational responses; such as: "sorry I don't understand" or "I can't do that right now". In some implementations, in the conversation system described herein, utilizes an extensive first-time user experience (FTUE) that allows the user to get playfully introduced to all the capabilities of the conversation agent and system and global commands that are available to interact and/or interface with the conversation agent.

Further, the conversation system or agent described herein may automatically detect if a user is frustrated or is attempting to get past a certain situation in the dialog. In these cases, the conversation system or agent may provide support to the user to advance beyond the current point in the conversation. In this way, the described dialog management module of the conversation system or agent may adapt to the user over time and thus, may avoid content or topics that will likely be overwhelming to the user.

User input and particularly spoken user input is often unplanned and is produced ad hoc. Classic advanced user interfaces, such as graphical user interfaces or interfaces relying on a keyboard and/or mouse, may therefore implement both visual aids (tooltips, icons, organization of data in folders), or buttons to conduct typical interaction (quit, minimize, close, etc.) with the user. In addition, macros may allow the user to undo/redo or cancel actions. Current chatbots and other dialog management systems are not equipped with such navigation capabilities. Thus, the conversation agent or system described herein has developed a novel and unique voice-based user interface that allows the user to intuitively navigate through content and a conversation dialog flow.

In some implementations, the user may even communicate with the conversation agent or system asking for relationships existing between words (e.g., what animal is similar to a giraffe?). In addition, the user may even communicate with the conversation agent or system to ask for or request definitions of words to receive additional information. Such knowledge and encyclopedic data may be retrieved utilizing the conversation agent or system and may be retrieved and/or loaded from publicly available datasets such as WordNet, Wikipedia, Merriam Webster, or other resources that the conversation agent or system communicates with.

Natural language understanding (NLU) is the only source of input for current conversational agents and systems. In some implementations, including the subject matter described and claimed herein, multimodal input may be utilized to better understand or disambiguate the user's intent, current state, or message, but in prior conversations agents was rarely used. In other systems, much of the multimodal information was discarded and ignored. However, in the conversation agent or system described and claimed herein, the multimodal input may be leveraged to better understand the meaning, intention (e.g., go get me that (pointing) from over there.), or affect of the user.

Further, language taken by itself out of context is often ambiguous. For example, a quick "yeah!" with a high pitch clearly signals agreement while an elongated "yeah?" with accompanying vocal fry conveys doubt. Current dialog management systems discard acoustic information or visual cues from the input and thus, these systems remove large parts of the signal content. The discarding of such information leads to frustrating misinterpretations and inefficient communications by a user with the conversation system. However, the conversation agent or system described herein may utilize acoustic information from voice input and/or visual cues from imaging input (e.g., facial expression, gestures, etc.) to assist in improving communications with the user.

One of the main limitations of current chatbots or conversation systems is that the conversation systems may follow a single flow of a conversation. In other words, these current conversation systems utilize short-term/working memory only. However, natural conversations can be comprised of multiple simultaneous flows (A simple example: A: "Did you see a feline at the zoo?" B: "What is a feline?", A: "The definition of feline: is cat." B: "Oh, right. Yes, I did see one at the zoo."). Current chatbots or conversation systems cannot recover and return to a prior flow in a meaningful way. Accordingly, all prior progress in the conversation achieved by the current conversation agent or system is lost when a tangent flow is invoked. In some implementations, the conversation system or agent described herein (e.g., a dialog management module) may maintain context of multiple concurrent flows and can efficiently and/or seamlessly switch context between the multiple concurrent flows. In addition, in some implementations, the dialog management module may maintain both a global memory as well as a localized context memory which allows for both short and long-term storage to be utilized for interacting with current, while remembering past, conversation flows. In some implementations, the global memory may be the long-term memory and the localized context memory may be the short-term memory.

The conversation agent and/or system described herein provides many advantages over current conversation agents and/or chatbots. In some implementations, after initial contact is made between a human user and a dialog management system, a multi-turn communication interaction may commence and exit at natural stopping point(s), without requiring the repeated use of a wake word. This is described in a co-pending patent application entitled "Systems And Methods To Manage Conversation Interactions Between A User And A Robot Computing Device or Conversation Agent", provisional patent application Ser. No. 62/983,590, filed Feb. 29, 2020, entitled "Systems And Methods To Manage Conversation Interactions Between A User And A Robot Computing Device Or Conversation Agent. In some implementations, during the multi-turn communication interaction a hierarchical conversation stack is built up in memory and this may allow the user to enter into one or more tangential conversations and/or seamlessly return to an initial part of the conversation that was left via the previous one or more tangential conversations. In some implementations, this conversation stack may be large and/or limited only by the physical and/or logical size of the memory.

In some implementations, when a dialog management module of the conversation agent or system is utilized for a first time, a first-time user experience (FTUE) sequence or process may be initiated that introduces the user to the conversation agent or system. In some implementations, during the FTUE process, the dialog management module of the conversation agent or system may teach the user global commands that allow the user to direct the conversation system. In some implementations, the global commands may include stop, continue, repeat, reset, restart, step back, change variables (volume, brightness, level, and other settings), undo/redo, get help, ask for definitions, inquire taxonomy/relations, and quit. In other implementations, different global commands may be established for communicating with the conversation system or agent. In some implementations, a set of tailored commands may be established and utilized to fit the needs of a particular application. In some implementations, the dialog management module of the conversation agent or system may also have the user speak to it via natural language and/or via wakewords. In some implementations, because the dialog manager module of the conversation system or agent utilizes global commands, the user may be further enabled to smoothly navigate through the current, past, and future context of conversation interactions suggested by the dialog manager module.

In some implementations, the planning manager module may provide or suggest alternative activities, conversation interactions, and/or augmented content to the user both proactively as well as upon request. In some implementations, the selection of the above-identified alternatives (activities, conversation interactions, augmented content) may be based on the present context of the conversation interaction, as well as the past activities, interactions, needs, and interests of the user that are stored in the long-term memory and that are interpreted by the planning manager module.

In some implementations, the dialog manager module may be capable of engaging in conversation interactions that require the interpretation of open responses by the user. In some implementations, the dialog manager module may manage a multimodal fusion algorithm to manage turn-taking and interruption handling as described in co-pending application entitled "Systems And Methods To Manage Conversation Interactions Between A User And A Robot Computing Device or Conversation Agent". In some implementations, the dialog manager module may minimize interruptions to the user input during conversation interactions. If interruptions do occur, the dialog manager module may handle the interruption smoothly and/or recover from the interruption gracefully.

In some implementations, the dialog management module may incorporate multimodal information (e.g., from voice, gesture, body expression, touch) rather than from a single modality, and thus the dialog management module may understand nuanced conversational interaction input and may thus be able to disambiguate and/or understand meaning under uncertain conditions. In some implementations, the dialog management module may proactively recognize if a user requires support within any given context of the conversation interaction and may provide appropriate information and re-prompts for a new response. In some implementation, the dialog management module or the planning manager may adapt over time to the user's needs and may provide an appropriate level of difficulty in the conversation interaction to the user. In some implementations, the dialog management module may, in case the user is not able to provide verbal input, rely on touch inputs, gesture inputs, digital support (e.g., a vocalization board or other digital communication aids), and American sign language input to engage in the conversation interaction.

In some implementations, the conversation system or agent may be installed and/or operating within a robot computing device. In some implementations, the conversation system or agent may be installed within another type of computing device. In some implementations, there might be a mixed system with some capabilities resident in the robot computing device and some capabilities enabled another computing device. The disclosure below is focused on the conversational aspects of the robot computing device and may be implemented by a conversation agent, a conversation module, a conversation system and/or other software directed to improving and/or enhancing conversations. In some implementations, the terms "robot computing device," "computing device," "digital companion," "computing device with voice recognition software," or "computing device with facial recognition software" may be used interchangeably and the systems and methods described herein may apply to each of these devices.

Figure 1B:
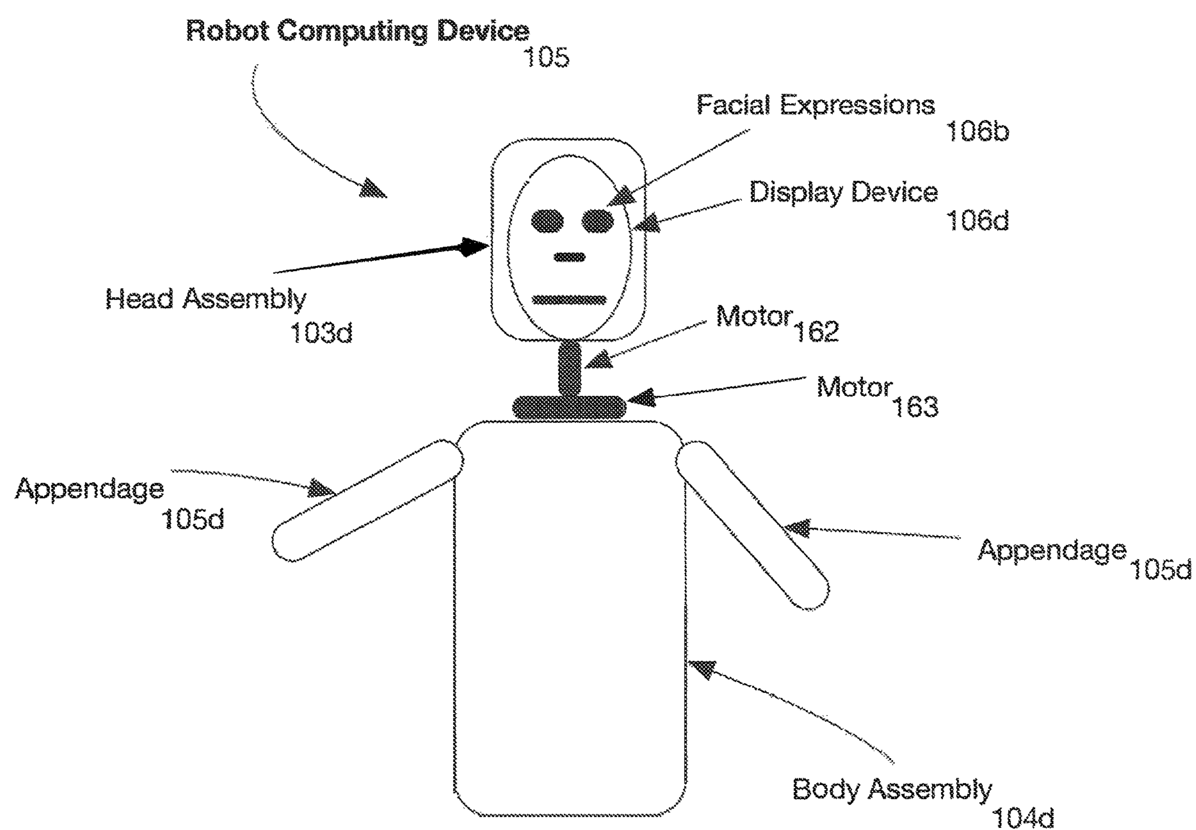
FIG. 1B illustrates a social robot or digital companion, in accordance with one or more implementations.
Figure 1C:
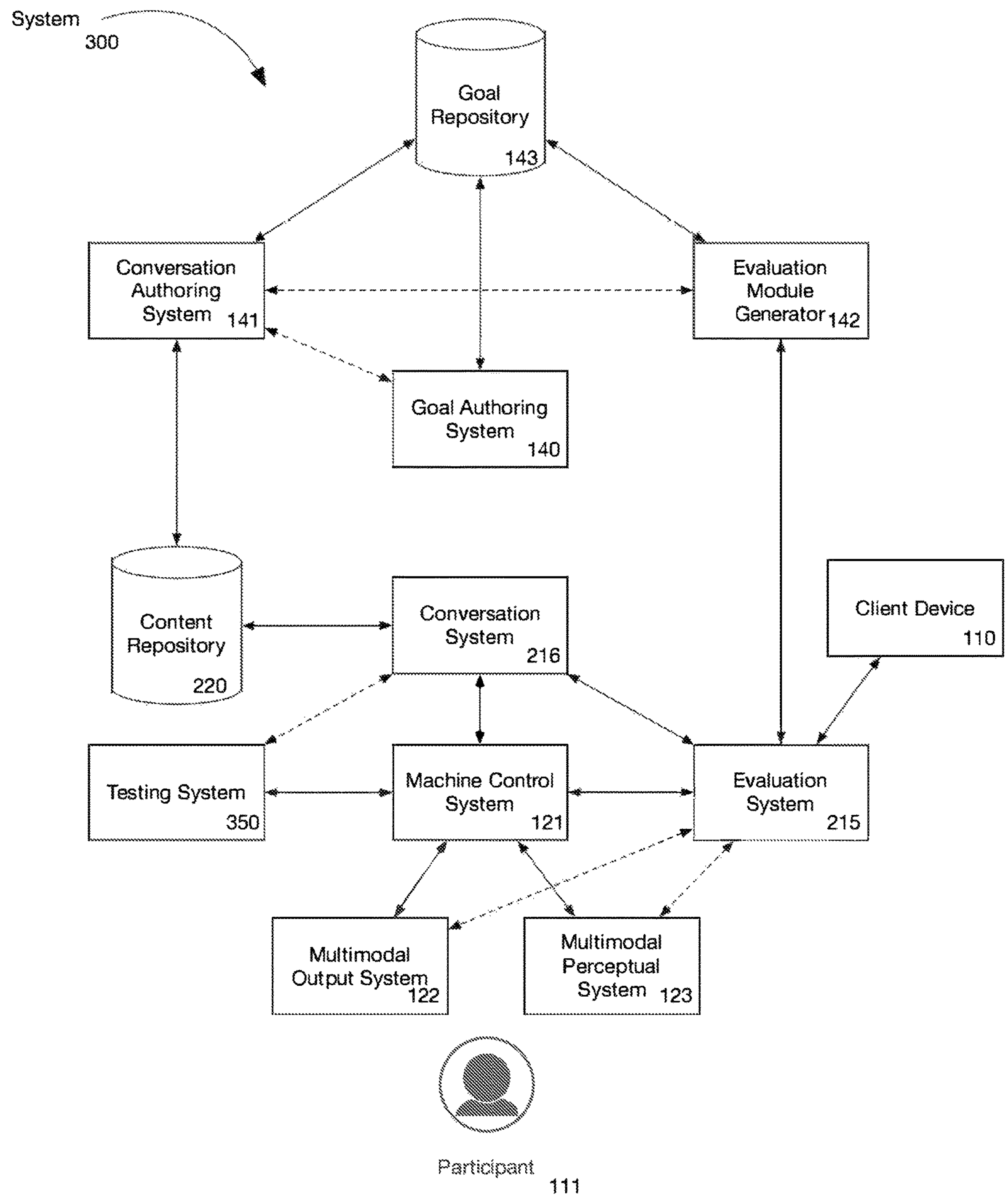
FIG. 1C illustrates modules or subsystems in a system where a child engages with a social robot or digital companion, in accordance with one or more implementations.

Although the term "robot computing device" is utilized herein, the teachings and disclosure herein also apply to digital companions, computing devices including voice recognition software and/or computing devices including facial and/or expression recognition software. In some cases, these terms are utilized interchangeably. FIG. 1A illustrates a system for a social robot or digital companion to engage a child and/or a parent, in accordance with one or more implementations. FIG. 1C illustrates modules or subsystems in a system where a child engages with a social robot or digital companion, in accordance with one or more implementations. FIG. 1B illustrates a social robot or digital companion, in accordance with one or more implementations. In some implementations, a robot computing device 105 (or digital companion) may engage with a child and establish communication interactions with the child. In some implementations, there will be bidirectional communication between the robot computing device 105 and the child 111 with a goal of establishing multi-turn conversations (e.g., both parties taking conversation turns) in the communication interactions. In some implementations, the robot computing device 105 may communicate with the child via spoken words (e.g., audio actions,), visual actions (movement of eyes or facial expressions on a display screen), and/or physical actions (e.g., movement of a neck or head or an appendage of a robot computing device). In some implementations, the robot computing device 105 may utilize imaging devices to evaluate a child's body language, a child's facial expressions and may utilize speech recognition software to capture and/or record the child's speech.

In some implementations, the child may also have one or more electronic devices 110. In some implementations, the one or more electronic devices 110 may allow a child to login to a website on a server of other cloud-based computing device in order to access a learning laboratory and/or to engage in interactive games that are housed on the web site. In some implementations, the child's one or more computing devices 110 may communicate with cloud computing devices 115 in order to access the website 120. In some implementations, the website 120 may be housed on server computing devices or other cloud-based computing devices. In some implementations, the website 120 may include the learning laboratory (which may be referred to as a global robotics laboratory (GRL) where a child can interact with digital characters or personas that are associated with the robot computing device 105. In some implementations, the website 120 may include interactive games where the child can engage in competitions or goal setting exercises. In some implementations, other users may be able to interface with an e-commerce website or program, where the other users (e.g., parents or guardians) may purchases items that are associated with the robot (e.g., comic books, toys, badges or other affiliate items).

In some implementations, the robot computing device or digital companion 105 may include one or more imaging devices, one or more microphones, one or more touch sensors, one or more IMU sensors, one or more motors and/or motor controllers, one or more display devices or monitors and/or one or more speakers. In some implementations, the robot computing devices may include one or more processors, one or more memory devices, and/or one or more wireless communication transceivers. In some implementations, computer-readable instructions may be stored in the one or more memory devices and may be executable to perform numerous actions, operations and/or functions. In some implementations, the robot computing device may perform analytics processing on data, parameters and/or measurements, audio files and/or image files captured and/or may be obtained from the components of the robot computing device in interactions with the users and/or environment.

In some implementations, the one or more touch sensors may measure if a user (child, parent or guardian) touches a portion of the robot computing device or if another object or individual comes into contact with the robot computing device. In some implementations, the one or more touch sensors may measure a force of the touch, dimensions, and/or direction of the touch to determine, for example, if it is an exploratory touch, a push away, a hug or another type of action. In some implementations, for example, the touch sensors may be located or positioned on a front and back of an appendage or a hand of the robot computing device, or on a stomach area of the robot computing device. Thus, the software and/or the touch sensors may determine if a child is shaking a hand or grabbing a hand of the robot computing device or if they are rubbing the stomach of the robot computing device. In some implementations, other touch sensors may determine if the child is hugging the robot computing device. In some implementations, the touch sensors may be utilized in conjunction with other robot computing device software where the robot computing device may be able tell a child to hold their left hand if they want to follow one path of a story of hold a left hand if they want to follow the other path of a story.

In some implementations, the one or more imaging devices may capture images and/or video of a child, parent or guardian interacting with the robot computing device. In some implementations, the one or more imaging devices may capture images and/or video of the area around (e.g., the environment around) the child, parent or guardian. In some implementations, the one or more microphones may capture sound or verbal commands spoken by the child, parent or guardian. In some implementations, computer-readable instructions executable by the processor or an audio processing device may convert the captured sounds or utterances into audio files for processing. In some implementations, the captured audio or video files and/or audio files may be utilized to identify facial expressions and/or help determine future actions performed or spoken by the robot device.

In some implementations, the one or more IMU sensors may measure velocity, acceleration, orientation and/or location of different parts of the robot computing device. In some implementations, for example, the IMU sensors may determine a speed of movement of an appendage or a neck. In some implementations, for example, the IMU sensors may determine an orientation of a section or the robot computing device, e.g., a neck, a head, a body or an appendage in order to identify if the hand is waving or in a rest position. In some implementations, the use of the IMU sensors may allow the robot computing device to orient its different sections of the body in order to appear more friendly or engaging to the user.

In some implementations, the robot computing device may have one or more motors and/or motor controllers. In some implementations, the computer-readable instructions may be executable by the one or more processors. In response, commands or instructions may be communicated to the one or more motor controllers to send signals or commands to the motors to cause the motors to move sections of the robot computing device. In some implementations, the sections may include appendages or arms of the robot computing device and/or a neck or a head of the robot computing device.

In some implementations, the robot computing device may include a display or monitor. In some implementations, the monitor may allow the robot computing device to display facial expressions (e.g., eyes, nose, or mouth expressions) as well as to display video or messages to the child, parent or guardian.

In some implementations, the robot computing device may include one or more speakers, which may be referred to as an output modality. In some implementations, the one or more speakers may enable or allow the robot computing device to communicate words, phrases and/or sentences and thus engage in conversations with the user. In addition, the one or more speakers may emit audio sounds or music for the child, parent or guardian when they are performing actions and/or engaging with the robot computing device.

In some implementations, the system may include a parent computing device 125. In some implementations, the parent computing device 125 may include one or more processors and/or one or more memory devices. In some implementations, computer-readable instructions may be executable by the one or more processors to cause the parent computing device 125 to perform a number of actions, operations and/or functions. In some implementations, these features and functions may include generating and running a parent interface for the system. In some implementations, the software executable by the parent computing device 125 may also alter user (e.g., child, parent or guardian) settings. In some implementations, the software executable by the parent computing device 125 may also allow the parent or guardian to manage their own account or their child's account in the system. In some implementations, the software executable by the parent computing device 125 may allow the parent or guardian to initiate or complete parental consent to allow certain features of the robot computing device to be utilized. In some embodiments, this may include initial partial consent for video and/or audio of a child to be utilized. In some implementations, the software executable by the parent computing device 125 may allow a parent or guardian to set goals or thresholds or settings what is captured from the robot computing device and what is analyzed and/or utilized by the system. In some implementations, the software executable by the one or more processors of the parent computing device 125 may allow the parent or guardian to view the different analytics generated by the system in order to see how the robot computing device is operating, how their child is progressing against established goals, and/or how the child is interacting with the robot computing device.

In some implementations, the system may include a cloud server computing device 115. In some implementations, the cloud server computing device 115 may include one or more processors and one or more memory devices. In some implementations, computer-readable instructions may be retrieved from the one or more memory devices and executable by the one or more processors to cause the cloud server computing device 115 to perform calculations and/or additional functions. In some implementations, the software (e.g., the computer-readable instructions executable by the one or more processors) may manage accounts for all the users (e.g., the child, the parent and/or the guardian). In some implementations, the software may also manage the storage of personally identifiable information in the one or more memory devices of the cloud server computing device 115. In some implementations, the software may also execute the audio processing (e.g., speech recognition and/or context recognition) of sound files that are captured from the child, parent or guardian, as well as generating speech and related audio file that may be spoken by the robot computing device 115. In some implementations, the software in the cloud server computing device 115 may perform and/or manage the video processing of images that are received from the robot computing devices.

In some implementations, the software of the cloud server computing device 115 may analyze received inputs from the various sensors and/or other input modalities as well as gather information from other software applications as to the child's progress towards achieving set goals. In some implementations, the cloud server computing device software may be executable by the one or more processors in order perform analytics processing. In some implementations, analytics processing may be behavior analysis on how well the child is doing with respect to established goals.

In some implementations, the software of the cloud server computing device may receive input regarding how the user or child is responding to content, for example, does the child like the story, the augmented content, and/or the output being generated by the one or more output modalities of the robot computing device. In some implementations, the cloud server computing device may receive the input regarding the child's response to the content and may perform analytics on how well the content is working and whether or not certain portions of the content may not be working (e.g., perceived as boring or potentially malfunctioning or not working).

In some implementations, the software of the cloud server computing device may receive inputs such as parameters or measurements from hardware components of the robot computing device such as the sensors, the batteries, the motors, the display and/or other components. In some implementations, the software of the cloud server computing device may receive the parameters and/or measurements from the hardware components and may perform IOT Analytics processing on the received parameters, measurements or data to determine if the robot computing device is malfunctioning and/or not operating at an optimal manner.

In some implementations, the cloud server computing device 115 may include one or more memory devices. In some implementations, portions of the one or more memory devices may store user data for the various account holders. In some implementations, the user data may be user address, user goals, user details and/or preferences. In some implementations, the user data may be encrypted and/or the storage may be a secure storage.

FIG. 1C illustrates functional modules of a system including a robot computing device according to some implementations. In some embodiments, at least one method described herein is performed by a system 300 that includes the conversation system 1216, a machine control system 121, a multimodal output system 122, a multimodal perceptual system 123, and an evaluation system 215. In some implementations, at least one of the conversation system 216, a machine control system 121, a multimodal output system 122, a multimodal perceptual system 123, and an evaluation system 215 may be included in a robot computing device, a digital companion or a machine. In some embodiments, the machine is a robot. In some implementations, the conversation system 216 may be communicatively coupled to a control system 121 of the robot computing device or machine. In some embodiments, the conversation system may be communicatively coupled to the evaluation system 215. In some implementations, the conversation system 216 may be communicatively coupled to a conversational content repository 220. In some implementations, the conversation system 216 may be communicatively coupled to a conversation testing system 350. In some implementations, the conversation system 216 may be communicatively coupled to a conversation authoring system 141. In some implementations, the conversation system 216 may be communicatively coupled to a goal authoring system 140. In some implementations, the conversation system 216 may be a cloud-based conversation system provided by a conversation system server that is communicatively coupled to the control system 121 via the Internet. In some implementations, the conversation system may be the Embodied Chat Operating System.

In some implementations, the conversation system 216 may be an embedded conversation system that is included in the robot computing device or implementations. In some implementations, the control system 121 may be constructed to control a multimodal output system 122 and a multi modal perceptual system 123 that includes one or more sensors. In some implementations, the control system 121 may be constructed to interact with the conversation system 216. In some implementations, the machine or robot computing device may include the multimodal output system 122. In some implementations, the multimodal output system 122 may include at least one of an audio output sub-system, a video display sub-system, a mechanical robotic subsystem, a light emission sub-system, a LED (Light Emitting Diode) ring, and/or a LED (Light Emitting Diode) array. In some implementations, the machine or robot computing device may include the multimodal perceptual system 123, wherein the multimodal perceptual system 123 may include the at least one sensor. In some implementations, the multimodal perceptual system 123 includes at least one of a sensor of a heat detection sub-system, a sensor of a video capture sub-system, a sensor of an audio capture sub-system, a touch sensor, a piezoelectric pressor sensor, a capacitive touch sensor, a resistive touch sensor, a blood pressure sensor, a heart rate sensor, and/or a biometric sensor. In some implementations, the evaluation system 215 may be communicatively coupled to the control system 121. In some implementations, the evaluation system 215 may be communicatively coupled to the multimodal output system 122. In some implementations, the evaluation system 215 may be communicatively coupled to the multimodal perceptual system 123. In some implementations, the evaluation system 215 may be communicatively coupled to the conversation system 216. In some implementations, the evaluation system 215 may be communicatively coupled to a client device 110 (e.g., a parent or guardian's mobile device or computing device). In some implementations, the evaluation system 215 may be communicatively coupled to the goal authoring system 140. In some implementations, the evaluation system 215 may include computer-readable-instructions of a goal evaluation module that, when executed by the evaluation system, may control the evaluation system 215 to process information generated from the multimodal perceptual system 123 to evaluate a goal associated with conversational content processed by the conversation system 216. In some implementations, the goal evaluation module is generated based on information provided by the goal authoring system 140.

In some implementations, the goal evaluation module 215 may be generated based on information provided by the conversation authoring system 140. In some embodiments, the goal evaluation module 215 may be generated by an evaluation module generator 142. In some implementations, the conversation testing system may receive user input from a test operator and may provide the control system 121 with multimodal output instructions (either directly or via the conversation system 216). In some implementations, the conversation testing system 350 may receive event information indicating a human response sensed by the machine or robot computing device (either directly from the control system 121 or via the conversation system 216). In some implementations, the conversation authoring system 141 may be constructed to generate conversational content and store the conversational content in one of the content repository 220 and the conversation system 216. In some implementations, responsive to updating of content currently used by the conversation system 216, the conversation system may be constructed to store the updated content at the content repository 220.

In some embodiments, the goal authoring system 140 may be constructed to generate goal definition information that is used to generate conversational content. In some implementations, the goal authoring system 140 may be constructed to store the generated goal definition information in a goal repository 143. In some implementations, the goal authoring system 140 may be constructed to provide the goal definition information to the conversation authoring system 141. In some implementations, the goal authoring system 143 may provide a goal definition user interface to a client device that includes fields for receiving user-provided goal definition information. In some embodiments, the goal definition information specifies a goal evaluation module that is to be used to evaluate the goal. In some implementations, each goal evaluation module is at least one of a sub-system of the evaluation system 215 and a sub-system of the multimodal perceptual system 123. In some embodiments, each goal evaluation module uses at least one of a sub-system of the evaluation system 215 and a sub-system of the multimodal perceptual system 123. In some implementations, the goal authoring system 140 may be constructed to determine available goal evaluation modules by communicating with the robot computing device or machine, and update the goal definition user interface to display the determined available goal evaluation modules.

In some implementations, the goal definition information defines goal levels for goal. In some embodiments, the goal authoring system 140 defines the goal levels based on information received from the client device (e.g., user-entered data provided via the goal definition user interface). In some embodiments, the goal authoring system 140 automatically defines the goal levels based on a template. In some embodiments, the goal authoring system 140 automatically defines the goal levels-based information provided by the goal repository 143, which stores information of goal levels defined form similar goals. In some implementations, the goal definition information defines participant support levels for a goal level. In some embodiments, the goal authoring system 140 defines the participant support levels based on information received from the client device (e.g., user-entered data provided via the goal definition user interface). In some implementations, the goal authoring system 140 may automatically define the participant support levels based on a template. In some embodiments, the goal authoring system 140 may automatically define the participant support levels based on information provided by the goal repository 143, which stores information of participant support levels defined form similar goal levels. In some implementations, conversational content includes goal information indicating that a specific goal should be evaluated, and the conversational system 216 may provide an instruction to the evaluation system 215 (either directly or via the control system 121) to enable the associated goal evaluation module at the evaluation system 215. In a case where the goal evaluation module is enabled, the evaluation system 215 executes the instructions of the goal evaluation module to process information generated from the multimodal perceptual system 123 and generate evaluation information. In some implementations, the evaluation system 215 provides generated evaluation information to the conversation system 215 (either directly or via the control system 121). In some implementations, the evaluation system 215 may update the current conversational content at the conversation system 216 or may select new conversational content at the conversation system 100 (either directly or via the control system 121), based on the evaluation information.

FIG. 1B illustrates a robot computing device according to some implementations. In some implementations, the robot computing device 105 may be a machine, a digital companion, an electro-mechanical device including computing devices. These terms may be utilized interchangeably in the specification. In some implementations, as shown in FIG. 1B, the robot computing device 105 may include a head assembly **103*d*, a display device 106*d*, at least one mechanical appendage 105*d* (two are shown in FIG. 1B), a body assembly 104*d*, a vertical axis rotation motor 163, and/or a horizontal axis rotation motor 162. In some implementations, the robot computing device may include a multimodal output system 122 and the multimodal perceptual system 123 (not shown in FIG. 1B, but shown in FIG. 2 below). In some implementations, the display device 106*d* may allow facial expressions 106*b* to be shown or illustrated after being generated. In some implementations, the facial expressions 106*b* may be shown by the two or more digital eyes, a digital nose and/or a digital mouth. In some implementations, other images or parts may be utilized to show facial expressions. In some implementations, the horizontal axis rotation motor 163 may allow the head assembly 103*d* to move from side-to-side which allows the head assembly 103*d* to mimic human neck movement like shaking a human's head from side-to-side. In some implementations, the vertical axis rotation motor 162 may allow the head assembly 103*d*** to move in an up-and-down direction like shaking a human's head up and down. In some implementations, an additional motor may be utilized to move the robot computing device (e.g., the entire robot or computing device) to a new position or geographic location in a room or space (or even another room). In this implementation, the additional motor may be connected to a drive system that causes wheels, tires or treads to rotate and thus physically move the robot computing device.

In some implementations, the body assembly **104*d* may include one or more touch sensors. In some implementations, the body assembly's touch sensor(s) may allow the robot computing device to determine if it is being touched or hugged. In some implementations, the one or more appendages 105*d* may have one or more touch sensors. In some implementations, some of the one or more touch sensors may be located at an end of the appendages 105*d* (which may represent the hands). In some implementations, this allows the robot computing device 105** to determine if a user or child is touching the end of the appendage (which may represent the user shaking the user's hand)).

Figure 2:
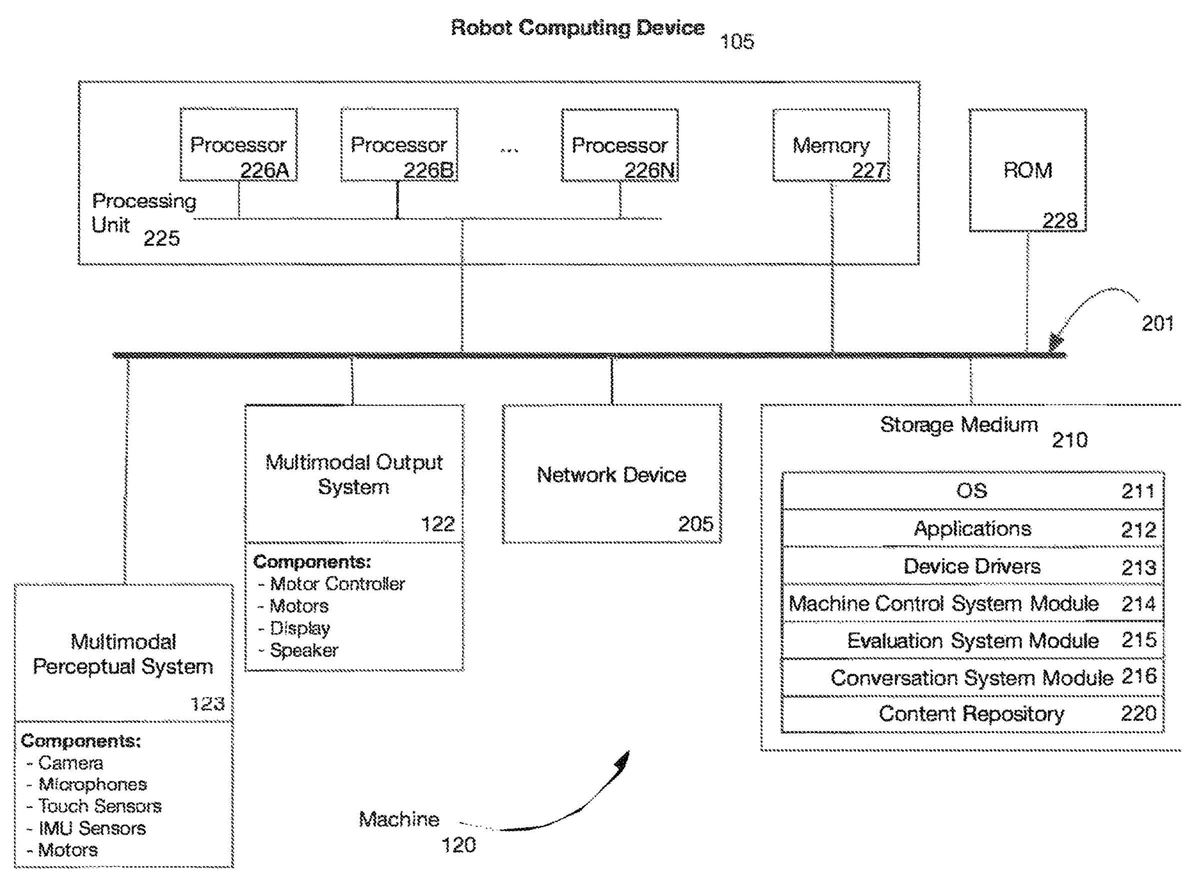
FIG. 2 illustrates a system architecture of an exemplary robot computing device, according to some implementations.

FIG. 2 is a diagram depicting system architecture of robot computing device (e.g., 105 of FIG. 1B), according to implementations. In some implementations, the robot computing device or system of FIG. 2 may be implemented as a single hardware device. In some implementations, the robot computing device and system of FIG. 2 may be implemented as a plurality of hardware devices. In some implementations, the robot computing device and system of FIG. 2 may be implemented as an ASIC (Application- Specific Integrated Circuit). In some implementations, the robot computing device and system of FIG. 2 may be implemented as an FPGA (Field-Programmable Gate Array). In some implementations, the robot computing device and system of FIG. 2 may be implemented as a SoC (System-on-Chip). In some implementations, the bus 201 may interface with the processors 226A-N, the main memory 227 (e.g., a random access memory (RAM)), a read only memory (ROM) 228, one or more processor-readable storage mediums 210, and one or more network device 211. In some implementations, bus 201 interfaces with at least one of a display device (e.g., 102*c*) and a user input device. In some implementations, bus 101 interfaces with the multimodal output system 122. In some implementations, the multimodal output system 122 may include an audio output controller. In some implementations, the multimodal output system 122 may include a speaker. In some implementations, the multimodal output system 122 may include a display system or monitor. In some implementations, the multimodal output system 122 may include a motor controller. In some implementations, the motor controller may be constructed to control the one or more appendages (e.g., 105*d*) of the robot system of FIG. 1B. In some implementations, the motor controller may be constructed to control a motor of an appendage (e.g., 105*d*) of the robot system of FIG. 1B. In some implementations, the motor controller may be constructed to control a motor (e.g., a motor of a motorized, a mechanical robot appendage).

In some implementations, a bus 201 may interface with the multimodal perceptual system 123 (which may be referred to as a multimodal input system or multimodal input modalities. In some implementations, the multimodal perceptual system 123 may include one or more audio input processors. In some implementations, the multimodal perceptual system 123 may include a human reaction detection sub-system. In some implementations, the multimodal perceptual system 123 may include one or more microphones. In some implementations, the multimodal perceptual system 123 may include one or more camera(s) or imaging devices.

In some implementations, the one or more processors 226A-226N may include one or more of an ARM processor, an X86 processor, a GPU (Graphics Processing Unit), and/or the like. In some implementations, at least one of the processors may include at least one arithmetic logic unit (ALU) that supports a SIMD (Single Instruction Multiple Data) system that provides native support for multiply and accumulate operations.

In some implementations, at least one of a central processing unit (processor), a GPU, and a multi-processor unit (MPU) may be included. In some implementations, the processors and the main memory form a processing unit 225. In some implementations, the processing unit 225 includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some implementations, the processing unit is an ASIC (Application-Specific Integrated Circuit).

In some implementations, the processing unit may be a SoC (System-on-Chip). In some implementations, the processing unit may include at least one arithmetic logic unit (ALU) that supports a SIMD (Single Instruction Multiple Data) system that provides native support for multiply and accumulate operations. In some implementations the processing unit is a Central Processing Unit such as an Intel Xeon processor. In other implementations, the processing unit includes a Graphical Processing Unit such as NVIDIA Tesla.

In some implementations, the one or more network adapter devices or network interface devices 205 may provide one or more wired or wireless interfaces for exchanging data and commands. Such wired and wireless interfaces include, for example, a universal serial bus (USB) interface, Bluetooth interface, Wi-Fi interface, Ethernet interface, near field communication (NFC) interface, and the like. In some implementations, the one or more network adapter devices or network interface devices 205 may be wireless communication devices. In some implementations, the one or more network adapter devices or network interface devices 205 may include personal area network (PAN) transceivers, wide area network communication transceivers and/or cellular communication transceivers.

In some implementations, the one or more network devices 205 may be communicatively coupled to another robot computing device (e.g., a robot computing device similar to the robot computing device 105 of FIG. 1B). In some implementations, the one or more network devices 205 may be communicatively coupled to an evaluation system module (e.g., 215). In some implementations, the one or more network devices 205 may be communicatively coupled to a conversation system module (e.g., 110). In some implementations, the one or more network devices 205 may be communicatively coupled to a testing system. In some implementations, the one or more network devices 205 may be communicatively coupled to a content repository (e.g., 220). In some implementations, the one or more network devices 205 may be communicatively coupled to a client computing device (e.g., 110). In some implementations, the one or more network devices 205 may be communicatively coupled to a conversation authoring system (e.g., 160). In some implementations, the one or more network devices 205 may be communicatively coupled to an evaluation module generator. In some implementations, the one or more network devices may be communicatively coupled to a goal authoring system. In some implementations, the one or more network devices 205 may be communicatively coupled to a goal repository. In some implementations, machine-executable instructions in software programs (such as an operating system 211, application programs 212, and device drivers 213) may be loaded into the one or more memory devices (of the processing unit) from the processor-readable storage medium, the ROM or any other storage location. During execution of these software programs, the respective machine-executable instructions may be accessed by at least one of processors 226A-226N (of the processing unit) via the bus 201, and then may be executed by at least one of processors. Data used by the software programs may also be stored in the one or more memory devices, and such data is accessed by at least one of one or more processors 226A-226N during execution of the machine-executable instructions of the software programs.

In some implementations, the processor-readable storage medium 210 may be one of (or a combination of two or more of) a hard drive, a flash drive, a DVD, a CD, an optical disk, a floppy disk, a flash storage, a solid-state drive, a ROM, an EEPROM, an electronic circuit, a semiconductor memory device, and the like. In some implementations, the processor-readable storage medium 210 may include machine-executable instructions (and related data) for an operating system 211, software programs or application software 212, device drivers 213, and machine-executable instructions for one or more of the processors 226A-226N of FIG. 2.

In some implementations, the processor-readable storage medium 210 may include a machine control system module 214 that includes machine-executable instructions for controlling the robot computing device to perform processes performed by the machine control system, such as moving the head assembly of robot computing device.

In some implementations, the processor-readable storage medium 210 may include an evaluation system module 215 that includes machine-executable instructions for controlling the robotic computing device to perform processes performed by the evaluation system. In some implementations, the processor-readable storage medium 210 may include a conversation system module 216 that may include machine-executable instructions for controlling the robot computing device 105 to perform processes performed by the conversation system. In some implementations, the processor-readable storage medium 210 may include machine-executable instructions for controlling the robot computing device 105 to perform processes performed by the testing system. In some implementations, the processor-readable storage medium 210, machine-executable instructions for controlling the robot computing device 105 to perform processes performed by the conversation authoring system.

In some implementations, the processor-readable storage medium 210, machine-executable instructions for controlling the robot computing device 105 to perform processes performed by the goal authoring system. In some implementations, the processor-readable storage medium 210 may include machine-executable instructions for controlling the robot computing device 105 to perform processes performed by the evaluation module generator.

In some implementations, the processor-readable storage medium 210 may include the content repository 220. In some implementations, the processor-readable storage medium 210 may include the goal repository 180. In some implementations, the processor-readable storage medium 210 may include machine-executable instructions for an emotion detection module. In some implementations, emotion detection module may be constructed to detect an emotion based on captured image data (e.g., image data captured by the perceptual system 123 and/or one of the imaging devices). In some implementations, the emotion detection module may be constructed to detect an emotion based on captured audio data (e.g., audio data captured by the perceptual system 123 and/or one of the microphones). In some implementations, the emotion detection module may be constructed to detect an emotion based on captured image data and captured audio data. In some implementations, emotions detectable by the emotion detection module include anger, contempt, disgust, fear, happiness, neutral, sadness, and surprise. In some implementations, emotions detectable by the emotion detection module include happy, sad, angry, confused, disgusted, surprised, calm, unknown. In some implementations, the emotion detection module is constructed to classify detected emotions as either positive, negative, or neutral. In some implementations, the robot computing device 105 may utilize the emotion detection module to obtain, calculate or generate a determined emotion classification (e.g., positive, neutral, negative) after performance of an action by the machine, and store the determined emotion classification in association with the performed action (e.g., in the storage medium 210).

In some implementations, the testing system 350 may a hardware device or computing device separate from the robot computing device, and the testing system includes at least one processor, a memory, a ROM, a network device, and a storage medium (constructed in accordance with a system architecture similar to a system architecture described herein for the machine 120), wherein the storage medium stores machine-executable instructions for controlling the testing system 150 to perform processes performed by the testing system, as described herein.

In some implementations, the conversation authoring system 141 may be a hardware device separate from the robot computing device 105, and the conversation authoring system may include at least one processor, a memory, a ROM, a network device, and a storage medium (constructed in accordance with a system architecture similar to a system architecture described herein for the robot computing device 105), wherein the storage medium stores machine-executable instructions for controlling the conversation authoring system to perform processes performed by the conversation authoring system.

In some implementations, the evaluation module generator 142 may be a hardware device separate from the robot computing device 105, and the evaluation module generator may include at least one processor, a memory, a ROM, a network device, and a storage medium (constructed in accordance with a system architecture similar to a system architecture described herein for the robot computing device), wherein the storage medium stores machine-executable instructions for controlling the evaluation module generator to perform processes performed by the evaluation module generator, as described herein.

In some implementations, the goal authoring system may be a hardware device separate from the robot computing device, and the goal authoring system may include at least one processor, a memory, a ROM, a network device, and a storage medium (constructed in accordance with a system architecture similar to a system architecture described instructions for controlling the goal authoring system to perform processes performed by the goal authoring system. In some implementations, the storage medium of the goal authoring system may include data, settings and/or parameters of the goal definition user interface described herein. In some implementations, the storage medium of the goal authoring system may include machine-executable instructions of the goal definition user interface described herein (e.g., the user interface). In some implementations, the storage medium of the goal authoring system may include data of the goal definition information described herein (e.g., the goal definition information). In some implementations, the storage medium of the goal authoring system may include machine-executable instructions to control the goal authoring system to generate the goal definition information described herein (e.g., the goal definition information).

Figure 3A:
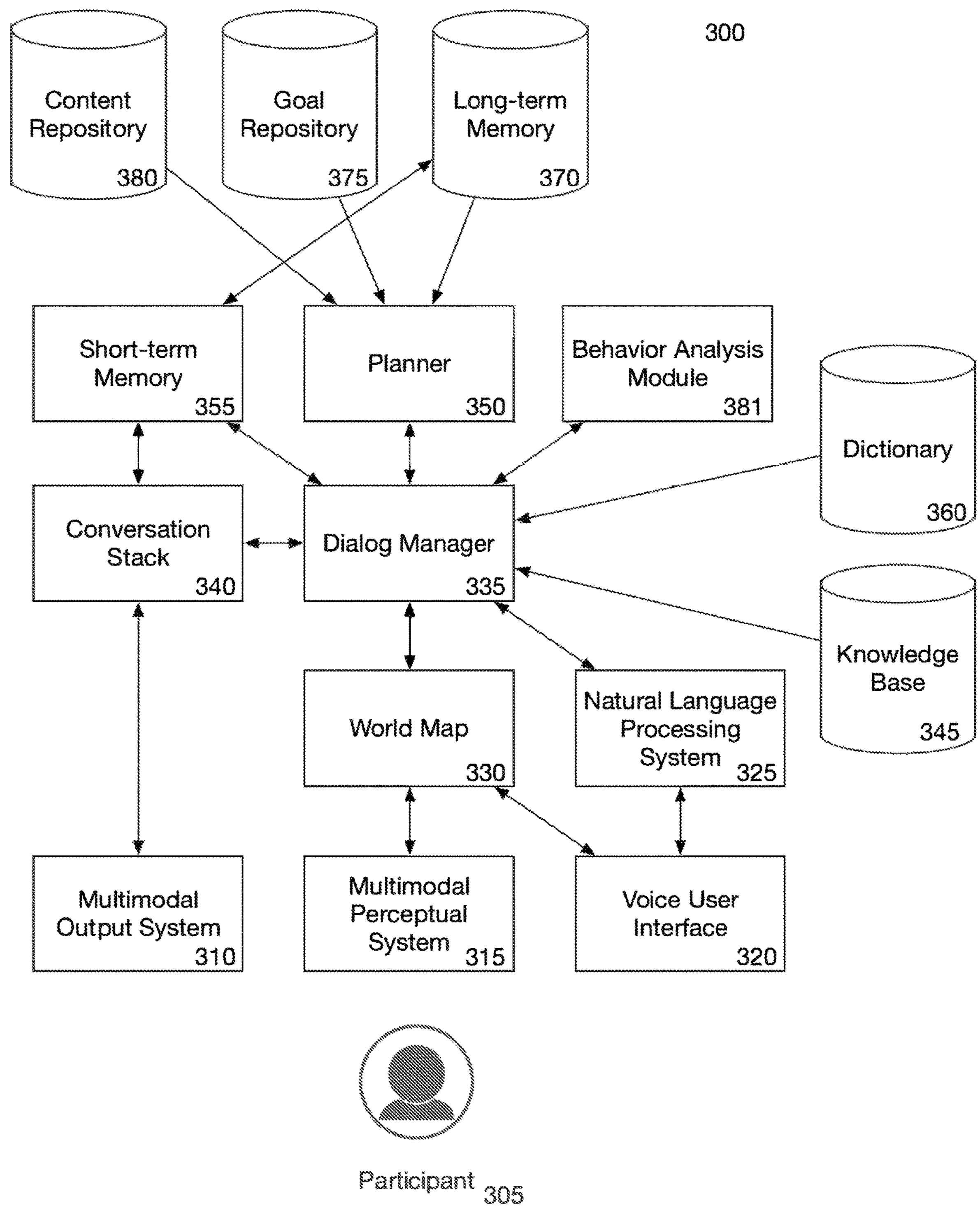
FIG. 3A illustrates a conversation system or agent according to some implementations.

FIG. 3A illustrates a conversation system or agent according to some implementations. In some implementations, the conversation system and/or agent may comprise a voice user interface 320, a multimodal perceptual system 315 (e.g., sensors), a multimodal output system 310, a natural language processing module 325, a world or environmental map module 330, a dialog manager module 335, a conversation stack module 340, and/or a knowledge base module or storage 345. In some implementations, the conversation system and/or agent 300 may include a dictionary storage or module 360, a planner module 350, a short-term memory module 355, a long-term memory module 370, a goal repository module 375, and/or a content repository module 380. In some implementations, a voice user interface 320 may include a line array of microphones to receive voice commands and/or audio files from a user. In some implementations, a voice user interface 320 may include one or more speakers to output audio files, voice files and/or other audible files to the user. In some implementations, a natural language processing module 325 may comprise computer-readable instructions executable to one or more processors to convert voice or audio files to text (on the input side) and to convert text files to audio files or audible sounds. In some implementations, the natural language processing module 325 may rely on or utilize a third-party voice recognition software (e.g., Google Speech-to-Text) to convert speech or audio files to text. In some implementations, the natural language processing module 325 may analyze the received one or more response text files in order to determine a number of characteristics or meanings (which could include the user's intent, current state and/or message). In addition, the natural language processing module 325 may also interpret the user's response text files, measure sentiment of response text files and determine what parts of the response text files are important. In some embodiments, the natural language processing module 325 may also be able to make these determinations by analyzing grammar and syntax rules, terms and/or slang to help resolve ambiguity in the received response text files. In some embodiments, the natural language processing module 325 may be able to use the parameters, characteristics, and/or measurements stored in both the short-term memory 355 and the long-term memory 370 to extract context from the received response text files and may be able to determine the syntactical meaning response text files. In these embodiments, the natural language processing module 325 may thus be able to resolve ambiguities in the response text files from the user. In some embodiments, multimodal input from the multimodal perceptual system 315 may be utilized to better understand or disambiguate the user's intent, current state, or message in the response files. In some embodiments, the multimodal perceptual system 315 may include one or more cameras, one or more motion or IMU sensors, one or more microphones, one or more touch sensors, one or more infrared or radar sensors. As mentioned previously, the conversation agent including the natural language processor module 325, dialog manager module 335 and/or the planner module 350 may utilize the various inputs from the multimodal perceptual system to better understand the meanings, intention and content of the user's responsive actions. In some implementations, the voice user interface may also utilize the one or more microphones for capturing sound or voice files from the user 320. In some implementations, the world map module 330 may utilize the multimodal perceptual system 315 to generate a map of the environment the robot computing device is currently in. In some implementations, the world map module 330 may also utilize the voice user interface 320 (e.g., the one or more microphones or microphone array) to detect the presence of the user. In some implementations, the multimodal perceptual system 315 may include one or more touch sensors to receive inputs from the user (e.g., there may be touch sensors on the hand, the body, the legs). In some implementations, the multimodal perceptual system 315 may also include one or more imaging devices to capture images of the area around the robot computing device. In some implementations, the imaging devices may be 360 degrees and capture images of individuals and/or objects in the area. In some implementations, the one or more microphones may capture audio sounds and may also determine a direction from where the sound comes from. The world map module 330 may receive one or more of these inputs from the multimodal perceptual system 315 and may create the world map and/or environment map. In some implementations, the world map module 330 may communicate the generated world map to the dialog manager module 335. In some embodiments, the multimodal output system 310 may include hardware components such as one or more speakers, the display and/or motors utilizing to control different components or parts (arms, neck, and/or head) of the robot computing device. In some implementations, the multimodal output system 310 may control gestures, motor movement, arm movement, facial expressions, a heads up display (HUD), voice infections and/or word selection via software executable by one or more processors and/or a combination of hardware and/or software.

In some implementations, the planner module or conversation planner 350 may generate conversations or conversation files to be utilized by the robot computing device (or conversation agent). In some implementations, the planner module 350 may receive inputs from a number of sources in order to generate the conversation interactions or conversation files. In some implementations, the content repository 380 may include past conversation interactions with this user and other users (which may or may not have similar characteristics to the user). In some implementations, the content repository 380 may have baseline plans or baseline conversation files. In some implementations, the baseline plans or baseline conversation files may be introductory baseline conversation files for all new users. In some implementations, the baseline plans or baseline conversation files or logs may be more advanced and may be tailored to the user that is interacting with the robot computing device. In some implementations, the baseline plans or conversation files or logs may depend on a set of preferences set by a user and/or learned over time from the conversation interactions the user has engaged in. In some implementations, the conversation planner module 350 may be coupled to the goal repository 375. In some embodiments, the conversation planner module 350 may receive individual goals and/or other similar user goals from the goal repository 375. In some implementations, the individual goals or other similar user goals may be utilized by the planner module to tailor or make the conversation interaction and/or conversation files or logs unique and personal for the user. In some implementations, the planner module 350 may also communicate and be coupled to the long-term memory 370. In some implementations, the long-term memory 370 may store preference parameters and data; emotional parameters and/or data as to how the patient was feeling last time; time parameters and/or data; and/or other parameters or measurements related to a user's prior conversation interactions. In some implementations, the planner module 350 may pull and/or retrieve these parameters in order to assist in creating the new conversation interactions or conversation files for the current interaction with the user. In some implementations, the planner module 350 may also interface with a behavioral analytics module 381.

In some implementations, the behavioral analytics module 381 has previously analyzed past communication interactions with users that are similar or have some characteristics in common with the current user. In some implementations, the behavioral analytics module 381 may provide the planner module 350 with recommendations for conversation interactions with the current users based on the current user having similar or the same characteristics as others. In some implementations, the planner module 350 may also include conversation training files and/or conversation training scripts. In some implementations, when a user first starts using a robot computing device, the planner module 350 may communicate a first-time user experience (FTUE) script and/or conversation file to the dialog manager module to begin engaging with the user 305 (e.g., utilizing the natural language processing system 325 and/or the voice user interface module 320). In some implementations, the FTUE script and/or conversation file may introduce the user to the robot computing device's capabilities by engaging with the user in an interactive conversation experience. In some implementations, the FTUE of the planner module 350 may teach the user the global commands that are able to be utilized by the robot computing device, as has been discussed above. In some implementations, after receiving the inputs from the various memories and/or modules, the planner module 350 may provide recommended conversation interactions and/or recommended conversation interaction files to the dialog manager module 335.

In some implementations, the dialog manager module 335 may receive the recommended conversation interaction and/or conversation interaction files and may determine what final conversation interaction and/or conversation interaction files may be communicated and/or available to the user. In some implementations, the dialog manager module 335 may be the final decision maker as to what is communicated to the user. In some embodiments, the dialog manager module 335 may make sure that the recommended conversation interaction scripts and/or conversation interaction files are logical and make sense (e.g., it checks that the conversation interaction files are in correct grammatical form and fit the context or topic of the conversation). In some implementations, the knowledge base module 345 analyzes the recommended conversation interaction scripts and/or conversation interaction files and makes sure then are requesting actions and/or responses make sense. In some implementations, the dialog management module 335 may make this determination by interfacing with the knowledge base module 345 to make sure there is a logical flow. In some embodiments, the dialog manager module 335 may communicate with an onboard dictionary (e.g., the Merriam-Webster Dictionary) to verify the correct words are being utilized, spelled correctly and/or used in the correct context. In some implementations, the dialog manager module 335 may then communicate the selected communication interaction and/or communication interactions to the natural language processing system 325 so that the conversation may be output or reproduced via the voice user interface module 320.

Figure 3B:
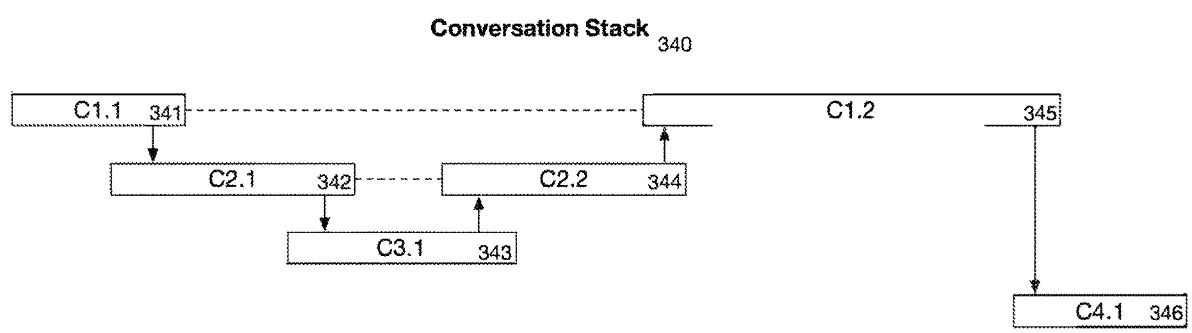
FIG. 3B illustrates a conversation interaction including tangential communications according to some implementations.

Another significant improvement in the described and claimed subject matter (e.g., a new and novel conversation agent and/or system) is the use of the conversation stack module 340 to keep track of conversations (and specifically tangential conversations that could lead prior conversation agents astray or off topic). In some implementations, the conversation stack module 340 may work with the short-term memory and store the previous portions of the communication interactions or logs in the short-term memory 355. In some implementations, after the conversation interaction has ended, parts of the communication interaction file or logs may be communicated to long-term memory 370 in order to be utilized and figure out what was previously said. FIG. 3B illustrates a conversation interaction including tangential communications according to some implementations. In some implementations, in step 341, a conversation agent (through the dialog manager) may ask the user "Did you see a feline at the zoo?" In some implementations, rather than answer directly, the user may ask a tangential question (e.g., such as in step 342 and C2.1, the user asks "What is a feline?). In some implementations, the conversation stack module may establish a link (which is shown between C1.1 and C1.2) to identify that the conversation agent or system is still waiting for an answer to the initial question. In some implementations, the conversation agent may answer, as illustrated in C3.1 and step 343, that the "The definition of feline: is cat." At the same time, the conversation stack module 340 establishes a link between C2.1 and C2.1 to identify that the conversation should move back to C2. In some implementations, the user then says "Oh, right", which is represented by C2.2 and reference number 344. Further, the user then returns to answer the original question by stating "Yes, I did see one at the zoo" which is represented by C1.2 and reference number 346. In some implementations, the conversation agent or system may then move to ask a new question "Was the Feline pretty?" which is represented by C4.1 and reference number 347. The conversation stack module 340 may keep track of the hierarchy of questions as well as understanding whether certain questions have been answered which allows for recovery from users asking tangential conversations. In some implementations, the conversation stack module may interface with the multimodal output system 310.

In some implementations, the multimodal output system 310, the multimodal perceptual system 315, the voice user interface 320, the natural language processor 325, the world map module 330, the dialog manager 335, the conversation stack module 340, the short-term memory 355, the planner module 350, the dictionary 360, the knowledge base memory or module 345 may be resident and/or located on the robot computing device. In some implementations, the content repository 380, the behavior analytics module 381, and/or the goal repository module 375 may not be resident on the robot computing device and may be located on other computing devices and/or remote server computing devices. In some implementations, the content repository 380, the behavior analytics module 381, and/or the goal repository module 375 may be resident on the robot computing device or installed as software and/or memory in the robot computing device.

Figure 3C:
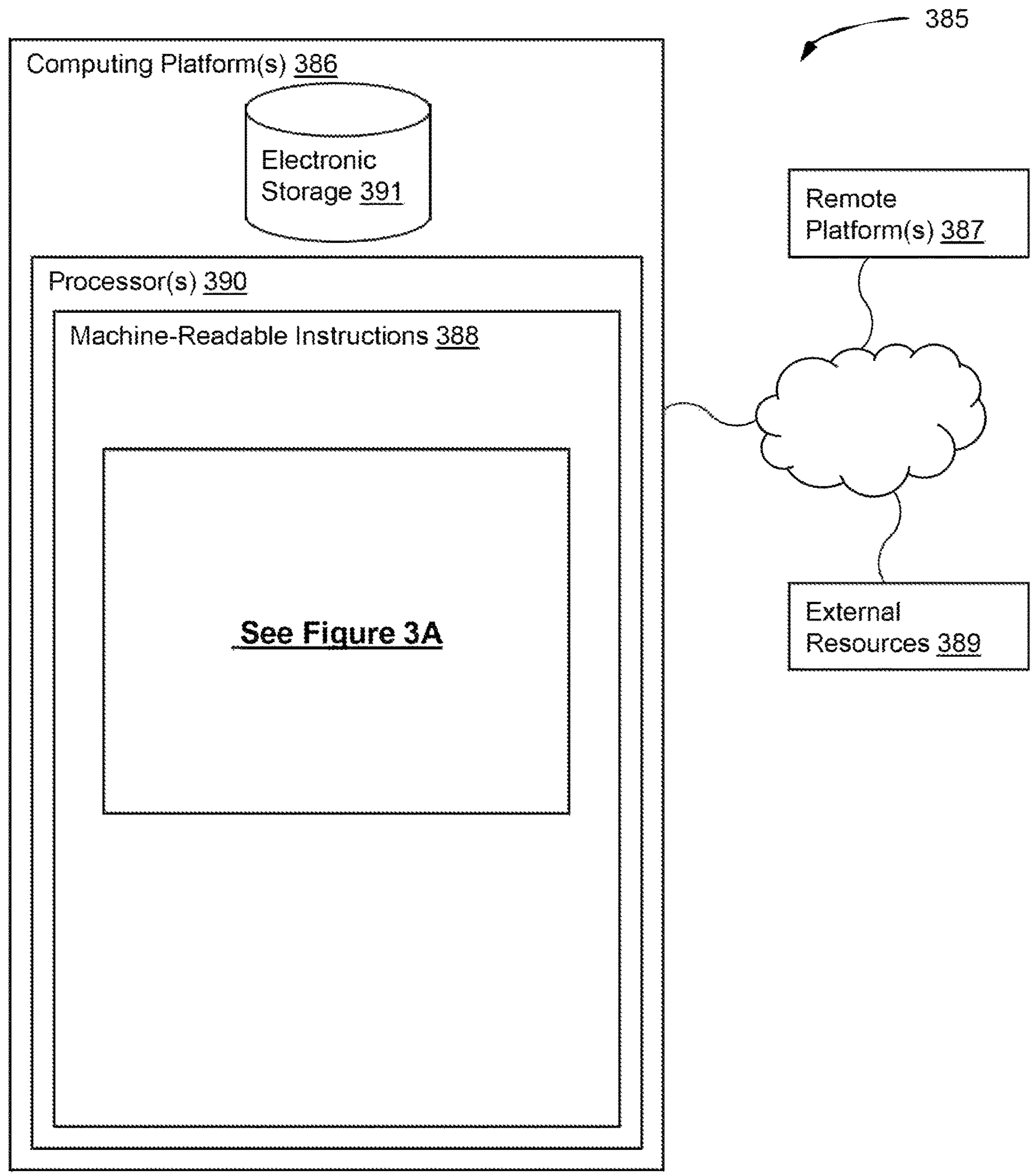
FIG. 3C illustrates a system configured for managing conversations between a robot computing device and a user, in accordance with one or more implementations.

FIG. 3C illustrates a system 385 configured for managing conversations between a robot computing device and a user, in accordance with one or more implementations. In some implementations, system 385 may include one or more computing platforms 386. Computing platform(s) 386 may be configured to communicate with one or more remote platforms 387 according to a client/server architecture, a peer-to-peer architecture, and/or other architectures. Remote platform(s) 387 may be configured to communicate with other remote platforms via computing platform(s) 306 and/or according to a client/server architecture, a peer-to-peer architecture, and/or other architectures. Users may access system 300 via remote platform(s) 386. One or more components described in connection with system 300 may be the same as or similar to one or more components described in connection with FIGS. 1, 1A, 1B, and 2. For example, in some implementations, computing platform(s) 386 and/or remote platform(s) 387 may be the same as or similar to one or more of the robot computing device 105, the one or more electronic devices 110, the cloud server computing device 115, the parent computing device 125, and/or other components.

Computing platform(s) 386 may be configured by machine-readable instructions 388. Machine-readable instructions 388 may include one or more instruction modules. The instruction modules may include computer program modules. The instruction modules may include one or more of modules and/or systems described above in FIG. 3A (e.g., multimodal output system 310, the multimodal perceptual system 315, the voice user interface 320, the natural language processor 325, the world map module 330, the dialog manager 335, the conversation stack module 340, the short term memory 355, the planner module 350, the dictionary 360, the knowledge base memory or module 345, and/or other instruction modules.

In some implementations, computing platform(s) 386, remote platform(s) 387, and/or external resources 389 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 386, remote platform(s) 387, and/or external resources 389 may be operatively linked via some other communication media.

A given remote platform 387 may include one or more processors configured to execute computer program modules. The computer program modules may be configured to enable an expert or user associated with the given remote platform 387 to interface with system 385 and/or external resources 389, and/or provide other functionality attributed herein to remote platform(s) 387. By way of non-limiting example, a given remote platform 387 and/or a given computing platform 386 may include one or more of a server, a desktop computer, a laptop computer, a handheld computer, a tablet computing platform, a NetBook, a Smartphone, a gaming console, and/or other computing platforms.

External resources 389 may include sources of information outside of system 385, external entities participating with system 385, and/or other resources. In some implementations, some or all of the functionality attributed herein to external resources 389 may be provided by resources included in system 385.

Computing platform(s) 386 may include electronic storage 391, one or more processors 390, and/or other components. Computing platform(s) 386 may include communication lines, or ports to enable the exchange of information with a network and/or other computing platforms. Illustration of computing platform(s) 386 in FIG. 3C is not intended to be limiting. Computing platform(s) 386 may include a plurality of hardware, software, and/or firmware components operating together to provide the functionality attributed herein to computing platform(s) 386. For example, computing platform(s) 386 may be implemented by a cloud of computing platforms operating together as computing platform(s) 386.

Electronic storage 391 may comprise non-transitory storage media that electronically stores information. The electronic storage media of electronic storage 391 may include one or both of system storage that is provided integrally (i.e., substantially non-removable) with computing platform(s) 386 and/or removable storage that is removably connectable to computing platform(s) 386 via, for example, a port (e.g., a USB port, a firewire port, etc.) or a drive (e.g., a disk drive, etc.). Electronic storage 391 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 391 may include one or more virtual storage resources (e.g., cloud storage, a virtual private network, and/or other virtual storage resources). Electronic storage 330 may store software algorithms, information determined by processor(s) 390, information received from computing platform(s) 386, information received from remote platform(s) 387, and/or other information that enables computing platform(s) 386 to function as described herein.

Processor(s) 390 may be configured to provide information processing capabilities in computing platform(s) 386. As such, processor(s) 390 may include one or more of a digital processor, an analog processor, a digital circuit designed to process information, an analog circuit designed to process information, a state machine, and/or other mechanisms for electronically processing information. Although processor(s) 390 is shown in FIG. 3C as a single entity, this is for illustrative purposes only. In some implementations, processor(s) 390 may include a plurality of processing units. These processing units may be physically located within the same device, or processor(s) 390 may represent processing functionality of a plurality of devices operating in coordination. Processor(s) 390 may be configured to execute or partially execute modules or systems 310, 315, 320, 325, 330, 335, 340, 345, 350, 355, 360, 370, 375, 380 and/or 381, and/or other modules. Processor(s) 390 may be configured to execute or partially execute modules or systems 310, 315, 320, 325, 330, 335, 340, 345, 350, 355, 360, 370, 375, 380 and/or 381, and/or other modules by software; hardware; firmware; some combination of software, hardware, and/or firmware; and/or other mechanisms for configuring processing capabilities on processor(s) 390. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules or systems 310, 315, 320, 325, 330, 335, 340, 345, 350, 355, 360, 370, 375, 380 and/or 381 are illustrated in FIG. 3A as being implemented within a single processing unit, in implementations in which processor(s) 390 includes multiple processing units, one or more of modules or systems 310, 315, 320, 325, 330, 335, 340, 345, 350, 355, 360, 370, 375, 380 and/or 381 may be implemented remotely from the other modules. The description of the functionality provided by the different modules or systems 310, 315, 320, 325, 330, 335, 340, 345, 350, 355, 360, 370, 375, 380 and/or 381 described below is for illustrative purposes, and is not intended to be limiting, as any of modules or systems 310, 315, 320, 325, 330, 335, 340, 345, 350, 355, 360, 370, 375, 380 and/or 381 may provide more or less functionality than is described. For example, one or more of modules or systems 310, 315, 320, 325, 330, 335, 340, 345, 350, 355, 360, 370, 375, 380 and/or 381 may be eliminated, and some or all of its functionality may be provided by other ones of modules or systems 310, 315, 320, 325, 330, 335, 340, 345, 350, 355, 360, 370, 375, 380 and/or 381. As another example, processor(s) 390 may be configured to execute one or more additional modules that may perform some or all of the functionality attributed below to one of modules or systems 310, 315, 320, 325, 330, 335, 340, 345, 350, 355, 360, 370, 375, 380 and/or 381.

Figure 4A:
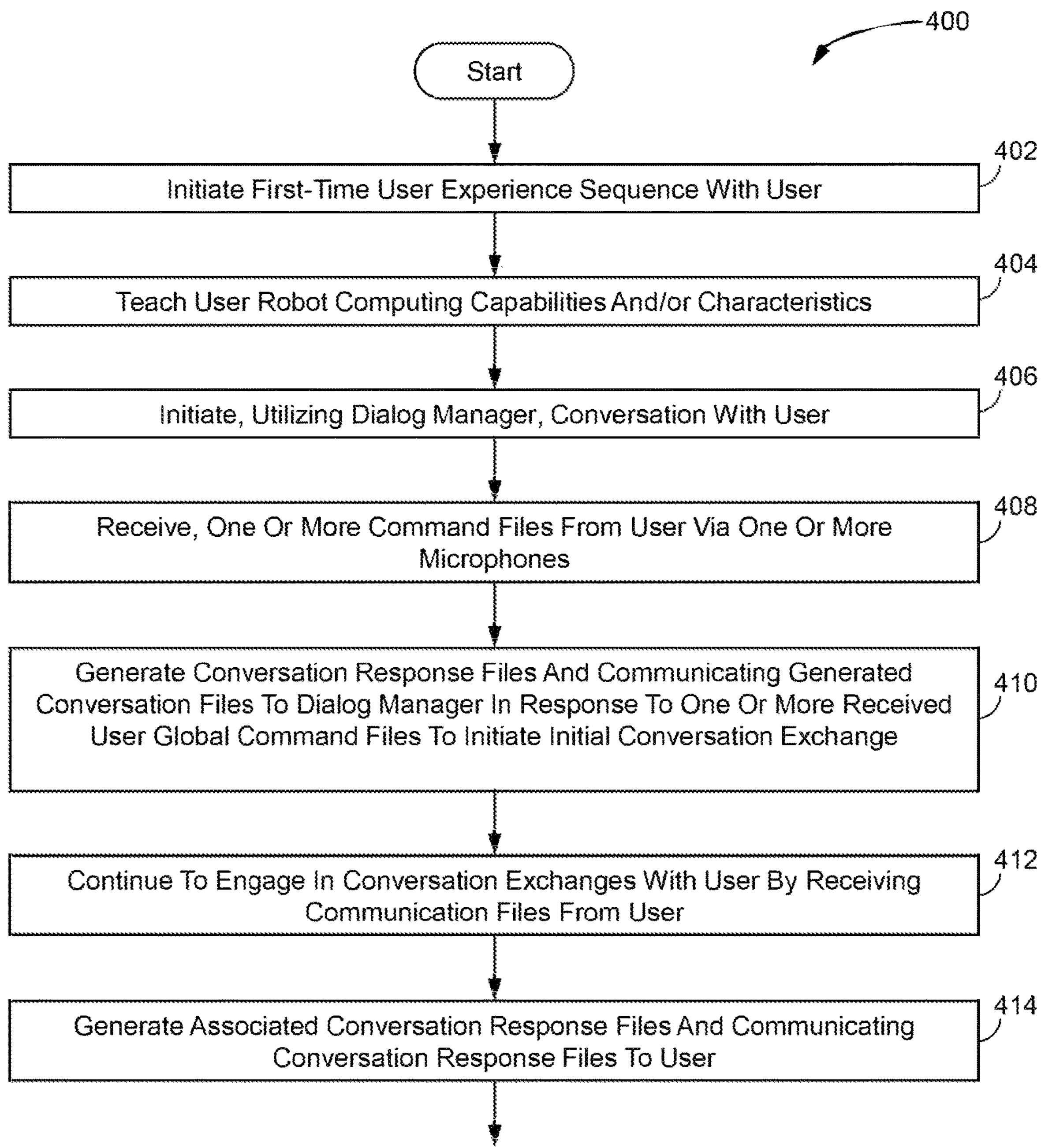
FIG. 4A illustrates a method for managing conversations between a robot computing device and a user, in accordance with one or more implementations.
Figure 4B:
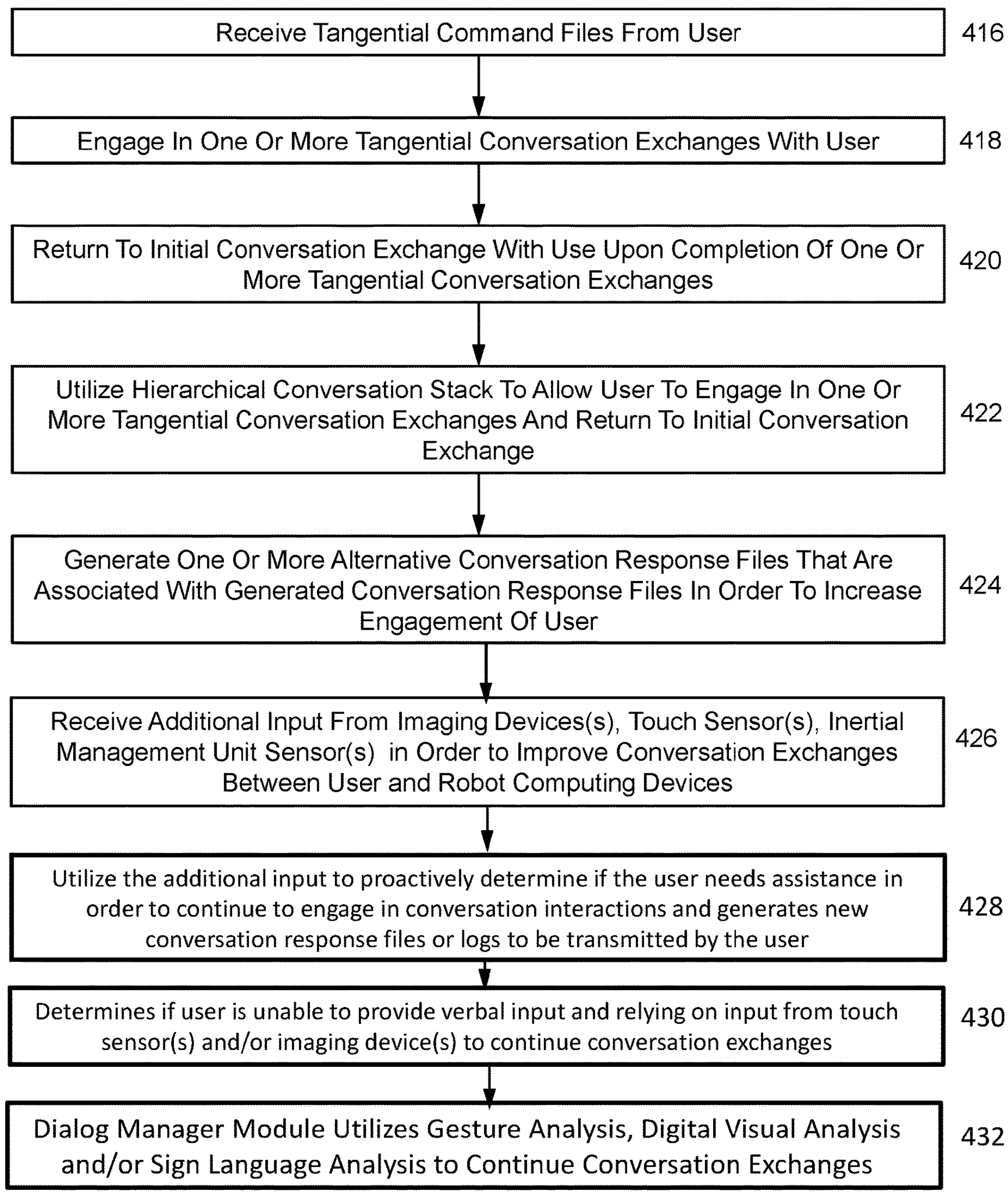
FIG. 4B illustrates additional methods for managing conversations between a robot computing device and a user, in accordance with one or more implementations.

FIG. 4A illustrates a method 400 for managing conversations between a robot computing device and a user, in accordance with one or more implementations. FIG. 4B illustrates a method 400 for managing conversations between a robot computing device and a user, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIGS. 4A and 4B and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

In some implementations, an operation 402 may include initiating a first-time user experience sequence with the user. In some implementations, an operation 404 may include teaching the user the robot computing capabilities and/or characteristics. In some implementations, a first-time user experience (FTUE) sequence may be teaching the user about the capabilities of the robot computing device through a communication interaction. In some implementations, a FTUE sequence may include teaching a user about global communication commands for the robot computing device. In some implementations, these global communication commands may include stop or hold on, continue, repeat, reset, restart, step back, change volume, brightness, difficulty level, and other settings; undo/redo, get help, ask for definitions, inquire taxonomy/relations, and/or quit (although tailored commands may also be utilized during a FTUE sequence). In some implementations, a multimodal perceptual system 315, the voice user interface module 320 and the multimodal output system 310 may be utilized when teaching the user about the capabilities of the robot computing device. Operations 402 and 404 may be performed by one or more hardware processors configured by machine-readable instructions including a module that is the same as or similar to planner module 350, in accordance with one or more implementations.

In some implementations, an operation 406 may include initiating, utilizing a dialog manager, a conversation with the user. In some implementations, the planner module 350, as described above, may recommend communication interactions with the user and/or may communicate communication interaction files and/or communication logs to the dialog manager module 335. In some implementations, the dialog manager module 335 may select one of the communication interaction files and/or communication logs and engage the user utilizing the natural language processing system 325 and a voice user interface module 320. Operation 406 may be performed by one or more hardware processors configured by machine-readable instructions including a module that is the same as or similar to planner module 350, dialog manager module 335, natural language processing system 325, and/or voice user interface module 320 in accordance with one or more implementations.

In some implementations, an operation 408 may include receiving, one or more command files or voice files, from the user via one or more microphones. Operation 408 may be performed by one or more hardware processors configured by machine-readable instructions including a module that is the same as or similar to voice user interface modules 320 and/or natural language processing system 325, in accordance with one or more implementations.

In some implementations, an operation 410 may include generating conversation response files or conversation response logs and communicating the generated conversation files or conversation response logs to the dialog manager 335 in response to the one or more received command files from the user to initiate an initial conversation exchange or interaction with the user. In some implementations, operation 410 may be performed by one or more hardware processors configured by machine-readable instructions including a module that is the same as or similar to the dialog manager module 335 and/or planner module 350, in accordance with one or more implementations.

In some implementations, an operation 412 may include further including continuing to engage in conversation exchanges with the user by receiving command communication files from the user through the voice user interface 320 and/or natural language processing system 325. In some implementations, the multimodal conversation-turn managing system may described in the provisional patent application Ser. No. 62/983,590, filed Feb. 29, 2020, entitled "Systems And Methods To Manage Conversation Interactions Between A User And A Robot Computing Device or Conversation Agent". Operation 412 may be performed by one or more hardware processors configured by machine-readable instructions including a module that is the same as or similar to voice user interface module 320 and/or natural language processing system 325, in accordance with one or more implementations.

In some implementations, the robot computing device may continue to respond to the user. In some implementations, an operation 414 may include generating associated conversation response files or conversation response logs and communicating conversation response files or conversation response logs to the user. This may continue until the user disengages from the robot computing device. One of the unique and novel aspects of the described and claimed conversation agent or system is the ability of the planner module 350 and the dialog manager module 335 to keep the user engaged by fusing together information, data, parameters and/or measurements from a variety of sources in order to identify a selected conversation response file and/or conversation response log that may best fit the current conversation exchange as well as to use in future conversation exchanges. In some implementations, the dialog manager module 335 utilizes many tools at its disposal to minimize interruptions in the conversation interactions with the user. In some implementations, operation 414 may be performed by one or more hardware processors configured by machine-readable instructions including a module that is the same as or similar to planner module 350 and/or dialog manager module 335, in accordance with one or more implementations.

In some implementations, the dialog manager module 335 may analyze the initial conversation exchange and/or the continuing conversation exchanges in order to determine a user communication or comprehension level for use in future conversation exchanges. In some implementations, the user communication or comprehension level may be stored in the long-term memory 370. In some implementations, the planning module may receive data, parameters and/or measurements from behavior analytics module 381. In some implementations, the data, parameters and/or measurements may identify a user's abilities and performance in past conversation exchanges with the user. Similarly, the planning manager module 350 may receive goal parameters, data and/or measurements from the goal repository database 375. In some implementations, the conversation planning manager 350 may utilize the data or parameters from the behavior analytics engine, the goal parameters and data and/or user preferences to utilize in future communication exchanges with the user to improve therapeutic and learning outcomes for the user.

In some implementations, another novel or unique feature of the described conversation system or agent is the ability to engage in tangential conversations and/or return back to the original conversation. In some implementations, an operation 416 may include further including receiving tangential command files from the user through the voice interface module 320 and/or the natural language processing system 325. Operation 416 may be performed by one or more hardware processors configured by machine-readable instructions including a module that is the same as or similar to voice interface module 320 and/or the natural language processing system 325, in accordance with one or more implementations.

In some implementations, an operation 418 may include a conversation system or conversation agent in the robot computing device engaging in one or more tangential conversation exchanges with the user. In some implementations, operation 418 may be performed by one or more hardware processors configured by machine-readable instructions including a module that is the same as or similar to dialog manager module 335 and/or planner module 350, in accordance with one or more implementations.

In some implementations, an operation 420 may include and returning to the initial conversation exchange with the use upon completion of the one or more tangential conversation exchanges. Operation 420 may be performed by one or more hardware processors configured by machine-readable instructions including a module that is the same as or similar to conversation stack module 340, short-term memory 355, dialog manager module 335 and/or planner module 350, in accordance with one or more implementations.

In some implementations, an operation 422 may include further including utilizing a hierarchical conversation stack module 340 to allow the user to engage in the one or more tangential conversation exchanges and return to the initial conversation exchange, as described above. Operation 422 may be performed by one or more hardware processors configured by machine-readable instructions including a module that is the same as or similar to conversation stack module 340, short-term memory 355, dialog manager module 335 and/or planner module 350, in accordance with one or more implementations.

Another novel and unique aspect of the described and claimed conversation agent and/or system is the ability for the agent or system to generate multiple and/or alternative responses to a user. In some implementations, an operation 424 may include further including generating one or more alternative conversation response files and/or conversation response logs that are associated with the generated conversation response files in order to increase engagement of the user. In some implementations, the one or more alternative communication response files or logs may be generated and/or initiated by a user requesting the alternative responses. In some implementations, the one or more alternative communication response file or logs may be initiated proactively by the conversation agent or system (e.g., a planner module 350 and the dialog manager 335). In some implementations, the selection of the generating of the one or more alternative communication response files or logs based, at least in part, on a) context of a current conversation, b) interests and/or preferences of the user, c) the past conversation files or logs of the user, d) requirements or goals of the user as retrieved from the goal repository 375, and/or e) past conversation files and/or logs of other users with similar interests or characteristics of the user. Operation 424 may be performed by one or more hardware processors configured by machine-readable instructions including a module that is the same as or similar to the planner module 350 with input from one or more of the content repository 380, a goal repository 375, long-term memory 370 and/or a behavior analytics module 381, in accordance with one or more implementations.

In some implementations, the conversation agent or system may utilize multimodal input in order to improve the conversation exchanges with the user. In some implementations, an operation 426 may further include receiving additional input from imaging devices(s), touch sensor(s), inertial management unit sensor(s) and microphone(s) in order to improve conversation exchanges between user and robot computing device. In some implementations, operation 426 may be performed by one or more hardware processors configured by machine-readable instructions including a module that is the same as or similar to the voice user interface module 320 and/or the multimodal perceptual system 315.

In some implementations, an operation 428 may utilize the additional input to proactively determine if the user needs assistance in order to continue to engage in conversation interactions and exchanges and generates new conversation response files or logs to be transmitted by the user. In some implementations, operation 428 may be performed by one or more hardware processors configured by machine-readable instructions including a module that is the same as or similar to the dialog manager module 335 and/or the planner module 350 and/or the multimodal perceptual system 315.

In some implementations, an operation 430 may determine if a user is unable to provide verbal input and relying on input from touch sensor(s) and/or imaging device(s) to continue conversation exchanges. In some implementations, an operation 432 may utilize gesture analysis, digital visual analysis and/or sign language analysis to continue conversation exchanges. In other words, the dialog manager 335 and the multimodal perceptual system 315 may analyze received input other than voice (e.g., images and/or touch sensor measurements) to determine if the user may still want to engage with the computing device and/or conversation agent. If it is determined the user still wants to engage, the dialog manager 335 may generate conversation response files or logs which may be communicated to the user. In some implementations, operations 430 and 432 may be performed by one or more hardware processors configured by machine-readable instructions including a module that is the same as or similar to the dialog manager module 335, the planner module 350 and/or the multimodal perceptual system 315.

In some embodiments, when the dialog manager module 335 is first initiated, the planner module 350 may communicate conversation files to the dialog manager module 335 that correspond to a first-time user experience (FTUE) script. In these embodiments, the FTUE script may train a user to learn global commands to operate the robot communication device (e.g., hold on, continue, repeat, reset, restart, step back, change variables (e.g., volume, brightness, level and other settings), undo/redo, get help, ask for definitions, inquire taxonomy/relations and quit). As an example, the dialog manager module 335 may interact with the user to teach the user these commands. In some embodiments, the dialog manager module 335 may communicate a number of these commands or all of these commands (via conversation interaction files) to the user one at a time via the one or more speakers of the multimodal output system 310. In some embodiments, the conversation interaction files may also include additional instructions and/or examples of how the global commands could be utilized (e.g., telling the user they can ask the robot computing device to change to a lower volume level or to change the display to a higher brightness level). After a certain period of time, the dialog manager module 335 may communicate an additional command via conversation interaction files to the user via the one or more speakers as discussed above (e.g., teaching the user they can ask for definitions of word (e.g., what is a feline or what is an aardvark). In this embodiment, the dialog manager module 335 may continue to send additional commands via conversation interaction files to the user (via the one or more speakers) until all of the commands that the robot computing device wants to teach the user about have been communicated to the user. As discussed above, the dialog manager module 335 may wait a certain period of time until communicating the next command. In some embodiments, the dialog manager module 335 may wait for the user to confirm that they understand the command and/or how to utilize the command before moving onto the next command. In this embodiment, for example, the dialog manager module 335 may communicate conversation interaction files that teach the user about the command "hold on" and how to utilize this command to stop the robot computing device from performing an action (including an example of "Moxie, Hold On"). The communication interaction files transmitted to the user via the one or more speakers may also include a request to the user to utilize the command or to verify that the user understands how to utilize the command (e.g., the command "hold on"). In this embodiment, the user may respond with "Moxie hold the phone" or "Yes I understand" and the voice user interface 320 and/or the multimodal perceptual system 315 may receive this response and communicate the response files to the natural language processor module 325 to the dialog manager module 335. In this embodiment, the dialog manager module 335 may verify that the responses in the response text files are acceptable (or what is expected) and then move on and communicate the next command to the user.

In some embodiments after the FTUE process has been completed, the robot computing device may begin a conversation with the user. In these embodiments, the dialog management module 335 may communicate one or more conversation files to the user utilizing the one or more speakers of the multimodal output system 310. In some embodiments, the communicated one or more conversation files may be generated from a predefined script for all new users that may be provided to the dialog manager module 335 by the planner module 350. In some embodiments, these initial conversation interaction files may be stored in the content repository module 380 before being communicated to the planner module 350. In some embodiments, if the parent and/or guardian has set up the robot computing device Parent Application, goals may be set for the user. In these embodiments, the goal repository module 375 may communicate the user's goals to the planner module 350. In these embodiments, the planner module 350 may take into consideration the user's goals in selecting the initial conversation interaction files that are to be communicated to the user. For example, one of the user's goals may be to increase reading comprehension or to increase the user's communications with friends. When the planner module 350 receives these goals from the goal repository 375, the planner module 350 may communicate conversation interaction files to the dialog manager module that include asking the user to read a book or to talk about their friends. In some embodiments, the parent and/or guardian may note (in the robot computing device Parent Application) that a user may have a condition that requires or needs special provisions. In some embodiments, these characteristics and/or parameters may be communicated to the goal repository 375, the short-term memory 355 or the long-term memory 370. In some embodiments, the planner module 350 may receive and/or retrieve these parameters and/or characteristics and may communicate these to the dialog manager module 335 to change characteristics, parameters or outputs of the conversation interaction files. As an illustrative example, if the parent or guardian identified that a user was blind, the dialog manager module 335 and/or the planner module 350 may not utilize the display to provide any information to the user. As another illustrative example, if the user had special provisions and did not process speech quickly, the dialog manager module 335 may instruct the multimodal output device to slow down playing of the voice files to the user.

In some embodiments, the dialog manager module 335 may continue to manage conversations with the user and try to extend these conversations into multi-turn conversations. In these embodiments, the dialog manager module 335 may receive user response files (via response text files after the natural language processor module 325 has converted response voice files to response text files) and communicate conversation response files back to the user via the one or more speakers until the robot computing device and user conversation ends.

In some embodiments, the user may have some issues with trying to engage in the conversation and the robot computing device's conversation agent may be able to assist the user. In some embodiments, the multimodal perceptual system 315 and/or the voice user interface module 320 may be utilized to identify the user is having issues. In some embodiments, the multimodal perceptual system 315 may utilize captured images from the one or more cameras and/or one or more sensor readings from the one or more sensors to identify that the user is confused and/or becoming disengaged. This can be used in conjunction with different inflections in the user's voice (captured by the one or more microphones) and analyzed by the natural language processing module 325 to identify that the user is having problems with following and/or continuing the conversation. In this embodiment, the planner module 350 and/or the dialog manager module 335 may generate conversation interaction files that address the user's confusion. For example, the conversation may have been discussing favorite types of the cars and the multimodal perceptual system 315 may capture images showing the user having a questioning look or gaze and/or voice files where the user says "huh." In this embodiment, the natural language processor module 325 may analyze the one or more voice files to identify that the user is confused and may also analyze the images to identify that the user is confused. After receiving this information, the planner module 350 may generate conversation files that include the phrases "are you confused about my question about cars" or "is your favorite type of car a big car, a small car or a fast car." The conversation interaction files may then be communicated by the dialog manager module 335 to the multimodal output system 310. The ability of the robot computing device to handle and/or address the user's confusion is another significant advantage of the claimed subject matter as compared to prior art chatbots or conversation agents.

In some embodiments, the robot computing device may also verify that the generated conversation files make logical sense. In some embodiments, before the dialog manager module 335 communicates the conversation interaction files to the user, the knowledge base module 345 may check to make sure the conversation interaction files make sense and/or flow in a logical manner. For example, if the conversation between the user and robot computing device is focused on talking about the user's friends, and the conversation interaction files include the robot computing device stating "I really like friendly dogs" or "I think you study for school", then the knowledge base module 345 may communicate to the dialog management module 335 to not communicate those conversation interaction files to the user and to retrieve and/or request that other conversation interaction files be provided. This ability to identify wayward or illogical conversation files in advance is another significant advantage of the claimed subject matter.

In some embodiments, during the conversation between the robot computing device and the user, the user may ask what a certain word means. In order for the robot computing device to be able to assist in keeping the conversation moving and obtain an answer for the user, the dialog manager module 335 may communicate with the dictionary module 360 in order to obtain the requested word or phrase definition and include the retrieved definition in the conversation interaction files communicated to the user via the one or more speakers. For example, in one of the user response files, the user may ask who the character Captain Marvel is or what the word "gravity" means. In these embodiments, after the natural language processing module 325 converts the response files to text, the dialog manager module may communicate with the dictionary module 360 to request the answer, and the dictionary module 360 may provide the answers to these questions to the dialog manager module 335. In these embodiments, the dialog manager module 335 may the communicate the conversation interaction files including the answers or definitions to the user.

In some embodiments, in order to enhance the conversation, the robot computing device may utilize conversations from other users with similar characteristics to assist in lengthening and/or enhancing the conversation with the current user. In these embodiments, the dialog manager module 335 may utilize the behavior analytics module 381 to draw upon these prior conversations of other users. In some embodiments, the behavior analytics module 381 may retrieve a similar conversation interaction or interactions and provide one or more conversation interaction files to the dialog manager module 335 to communicate to the user. As an example, the current conversation between the user may involve spaceships or rockets and the behavior analytics module 381 may note that other users that were talking about spaceships also liked talking about planets (and specifically Mars) or liked talking about aliens. In these embodiments, the behavior analytics module 381 may provide conversation interaction files including topics such as Mars ("Do you want to learn about Mars") or aliens ("What do you think space aliens look like") to the dialog manager module 335, which may then communicate one or more of these conversation interaction files to the user. The ability to utilize past conversation interactions with other users to improve a current conversation is another unique feature of the claimed subject matter.

The conversation agent in the robot computing device may also keep track of conversations and may utilize this information to enhance and/or lengthen further conversations with the user. In some embodiments, the content repository module 380 may store old conversation interaction files the robot computing device had with the user (including whether or not the conversations were successful). In some embodiments, the long-term memory 370 may include parameters relating to the user's past conversations and/or unique characteristics. These parameters include time parameters (how long the prior conversation interactions were), emotion parameters (how the user was feeling during past conversation interactions), and/or preference parameters (e.g., what topics the user likes to discuss when interfacing with the robot computing device). When a user is initiating a conversation after the initial setup conversation, the dialog manager module 335 communicates with the planner module 350 to determine conversation interaction files to be communicated to the user. In these embodiments, the planner module 350 may interface with the long-term memory 370 and/or the content repository 380 to retrieve conversation interaction files tailored and/or focused on the user. In some embodiments, the planner module 350 may communicate these selected and focused conversation interaction files to the dialog manager module 335, which then communicates the selected conversation interaction files to the user via the one or more speakers. For example, the long-term memory 370 may have user parameters that the user recently had a birthday and was very excited the last time the robot computing device interacted with the user. In addition, the content repository 380 may also identify that the user has talked about her pets the last few times she has talked to the robot computing device. In this embodiment, the planner module 350 may receive this information from the content repository 380 and/or the long-term memory 370 and generate conversation interaction files that include questions about asking the user whether she had a good birthday and what happened during the birthday, as well as discussing her pets. The planner module 350 may communicate these birthday and pet-related conversation interaction files to the dialog manager module 335 and the dialog manager module 335 may determine in what order to communicate these birthday-related and/or pet-related conversation interaction files to the user. This unique feature allows the robot computing device to learn from past conversation interactions and/or have unique and/or personalized conversations with the users, which is not present in other prior chatbots or conversation agents.

The robot computing device also has the ability to generate multiple alternative conversation interaction files that the planner module 350 may then communicate to the dialog manager module 335. In these embodiments, the dialog manager module 335 may then decide which of the alternative conversation interaction files are delivered to the user. As an example, as a conversation is occurring between the user and the robot computing device, the following actions may also be occurring: 1) the behavior analysis module 381 may analyze the conversations and note that similar users to the current user like discussing how school is going; 2) the long-term memory 370 may identify that the user was upset about her friends the last time she talked to the robot computing device; 3) the content repository module 380 may identify that conversation interactions discussing her grandmother were normally long; and 4) the natural language processing module 325, the multimodal perceptual system 315, and/or the voice user interface 320 may note that the user is happy and giggling and telling jokes to the robot computing device. In these embodiments, this information and/or conversation interaction files may be communicated to the planner module 350 and the planner module 350 may generate multiple or alternative conversation interaction files based on each of these subjects (e.g., 1) one or more conversation interaction files discussing school (e.g., "are you still getting all As in school"); 2) one or more conversation interaction files asking about whether she is feeling better about her friends ("are your friends being nicer to you"); 3) one or more conversation interaction files about her grandmother ("was your grandmother really a doctor"); and 4) one or more conversation interaction files asking the user to tell the robot computing device another joke. In this embodiment, the planner module 350 may communicate these alternative conversation interaction files to the dialog manager module 335. In this embodiment, the dialog manager module 335 may then select which of these alternative conversation interaction files may be communicated to the user. Most other conversation agents or chatbots may barely be able to handle one conversation topic whereas the claimed subject matter may be able to generate and/or communicate to the user.

In some embodiments, if the user is deaf or hard or hearing, if there is noise in the environment and/or if the speakers and/or microphones are not working, the user may not be able to communicate verbally with the robot computing device. In these embodiments, the robot computing device may need to utilize the multimodal perceptual system 315 in order to engage in conversation interactions with the user. In these embodiments, the user may utilize sign language, gestures and/or movements to communicate and establish a conversation with the robot computing device. In some embodiments, the one or more imaging devices and/or sensor devices of the multimodal perceptual system 315 may capture images and/or videos (and/or sensor measurements). In these embodiments, the movement software, gesture analysis software and/or sign language software may analyze the captured images and/or videos and may communicate identified gestures, signs and movements to the planner module 350 and/or dialog manager module 335 so that they can generate conversation interaction files in response to user's signs, movements and/or gestures. For example, the robot computing device may ask the user whether they want to learn about robots, rockets and/or baseball and the user may sign they want to learn about baseball. In this embodiment, the camera may capture the user signing "baseball" and the sign language software may analyze the captured image and determine if the user wants to talk about baseball. In this case, the dialog manager module 335 may communicate conversation interaction files regarding baseball to the user. Similarly, the user may hold up one finger and/or shake his head up and down when the robot computing device says the word robots. In this embodiment, the camera may the capture the user making these gestures and/or movements and the gesture analysis software or image analysis software of the multimodal perceptual system 315 may analyze these images and/or extract the gestures and/or movements and communicate this to the planner module 350 and/or the dialog manager module 33. These modules may then generate conversation interaction files related to robots and may communicate these robot-related conversation interaction files to the user. This may continue until the user determines to stop interacting with the robot computing device. This is a significant advantage over prior art chatbots and/or conversation agents that are not able to work if there is no verbal communication. The claimed subject matter is so unique because it is a chatbot and/or conversation agent that does not require the user to speak in order to carry on a conversation.

As detailed above, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. For example, one or more of the devices recited herein may receive image data of a sample to be transformed, transform the image data, output a result of the transformation to determine a 3D process, use the result of the transformation to perform the 3D process, and store the result of the transformation to produce an output image of the sample. Additionally, or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising.

The processor as disclosed herein can be configured with instructions to perform any one or more steps of any method as disclosed herein.

As used herein, the term "or" is used inclusively to refer items in the alternative and in combination. As used herein, characters such as numerals refer to like elements.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method of managing conversations between a robot computing device and a user, comprising:

accessing computer-readable instructions from one or more memory devices for execution by one or more processors of the robot computing device;

executing the computer-readable instructions accessed from the one or more memory devices by the one or more processors of the robot computing device; and wherein executing the computer-readable instructions further comprising:

initiating a first-time user experience sequence with a user;

teaching the user the robot computing device capabilities and/or characteristics by communicating one or more global commands utilized by the robot computing device to the user via the one or more speakers to teach the user how to communicate verbally with the robot computing device;

initiating, utilizing a dialog manager nodule, a conversation with the user;

receiving, one or more command files from the user via one or more microphones; and generating one or more conversation response files and communicating the generated one or more conversation files to the dialog manager in response to the one or more received user command files to initiate an initial conversation exchange;

receiving tangential conversation files from the user, the tangential conversation files not being responsive to the one or more conversation response files generated by the robot computing device, engaging in one or more tangential conversation exchanges with the user by generating tangential conversation files, the tangential responsive conversation files responsive to the tangential conversation files;

generating at the one or more speakers, audible tangential responses to the user based at least in part on the tangential responsive conversation files; and returning to the initial conversation exchange with the user upon completion of the one or more tangential conversation exchanges.

2. The method of claim 1, wherein executing the computer-readable instructions further comprising continuing to engage in conversation exchanges with the user by receiving communication files from the user, generating associated conversation response files and communicating the conversation response files to the user.

3. The method of claim 1, wherein executing the computer-readable instructions further comprising utilizing a hierarchical conversation stack module to allow the user to engage in the one or more tangential conversation exchanges by verifying the one or more tangential conversation exchanges have been answered and return to the initial conversation exchange which include the one or more conversation response files.

4. The method of claim 1, wherein the robot computing device stores in a short-term memory device the one or more conversation response files until the one or more tangential conversation exchanges have completed and generating a link to the short-term memory device that is accessed once the one or more tangential conversation exchanges have completed.

5. The method of claim 1, wherein the one or more global communication commands comprise hold on, continue, repeat, reset, restart, step back, change volume, brightness, difficulty level, and other settings; undo/redo, get help, ask for definitions, inquire taxonomy/relations, or quit.

6. The method of claim 1, wherein executing the computer-readable instructions further comprising generating one or more alternative conversation response files that are associated with the generated conversation response files in order to increase engagement of the user.

7. The method of claim 6, wherein the generating the one or more alternative communication response are initiated upon request of the user; are initiated proactively by the dialog manager module; are based at least in part on context of the one or more conversation response files; are based on interests preferences and/or parameters of the user that are stored in the goal repository module, a short-term memory device or a long-term memory device; or based at least in part on past conversation interaction files of the user that are stored in the short-term memory device or the long-term memory device.

8. The method of claim 6, wherein the generating of the one or more alternative communication response files is based at least in part on past conversation interaction files of other users with similar interests or characteristics of the user; the past conversation interaction files retrieved from a short-term memory device or a long-term memory device.

9. The method of claim 6, wherein the generating of the one or more alternative communication response files is based at least in part on requirements or goals of the user, the goals of the user stored in the goal repository of the robot computing device.

10. The method of claim 2, wherein continuing the conversation exchanges after the initial conversation exchange further comprises invoking the multimodal input conversation turn managing system.

11. The method of claim 2, wherein executing the computer-readable instructions further comprising receiving additional input from one or more imaging devices, one or more inertial management unit sensors and/or one or more touch sensors; and wherein the additional input is utilized along with the conversation files received from the one or more microphones to improve the conversation exchanges between the user and the robot computing device or wherein the additional input is utilized to proactively determine if the user needs assistance to continue the conversation exchanges and generate new conversation files to be communicate via one or more speakers to the user.

12. The method of claim 2, wherein if the user is not able to provide verbal input via the one or more microphones, the dialog manager module utilizes input from a touch sensor and one or more imaging devices to continue the conversation exchanges from the user.

13. The method of claim 12, wherein executing the computer-readable instructions further comprising performing by the dialog manager module, gesture analysis, digital visual analysis, and/or sign language analysis on one or more images or videos received from the one or more imaging devices to continue the conversation exchanges with the user.

14. The method of claim 2, wherein executing the computer-readable instructions further comprising the dialog manager module analyzing the initial conversation exchange and the continuing conversation exchanges to determine a user communication level for use in future conversation exchanges.

15. The method at claim 2, wherein executing the computer-readable instructions further comprising a planner module receiving data or parameters from a behavior analytics module, wherein the data or parameters identify a user's abilities and performance in past conversation exchanges with the user and receiving goal parameters and data from the goal repository database.

16. The method of claim 15, wherein executing the computer-readable instructions further comprising the planner module utilizing the data or parameters from the behavior analytics module, the goal parameters and data from the planner module and/or user preferences to utilize in future communication exchanges with the user to improve therapeutic and learning outcomes for the user.

17. The claim of claim 1, wherein executing the computer-readable instructions further comprising receiving a confirmation voice file generated by the user confirming understanding of the communicated one or more global commands that was communicated to the user.

18. The method of claim 1, wherein executing the computer-readable instructions further comprising:

sequentially communicating the one or more global commands to the user via the one or more speakers with a pause in time between the communicated one or more global commands.

* * * * *